United States Patent
Ainaka et al.

(10) Patent No.: US 11,990,988 B2
(45) Date of Patent: May 21, 2024

(54) OPTICAL TRANSMISSION SYSTEM AND OPTICAL TRANSMISSION DEVICE

(71) Applicant: FUJITSU LIMITED, Kawasaki (JP)

(72) Inventors: Naoki Ainaka, Kawasaki (JP); Yoshito Kachita, Kawasaki (JP); Tomohiro Yamauchi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/872,329

(22) Filed: Jul. 25, 2022

(65) Prior Publication Data

US 2022/0385390 A1    Dec. 1, 2022

(30) Foreign Application Priority Data

Apr. 28, 2022 (JP) ................. 2022-074218

(51) Int. Cl.
*H04J 14/02* (2006.01)

(52) U.S. Cl.
CPC ................. *H04J 14/0221* (2013.01)

(58) Field of Classification Search
CPC .... H04J 14/0221; H04J 14/02; H04J 14/0206; H04J 14/021; H04J 14/0241; H04J 14/0278; H04B 10/0775; H04B 10/07953; H04B 10/0799; H04B 10/25137; H04B 10/564; H04B 10/572; H04B 10/40;
(Continued)

(56) References Cited

U.S. PATENT DOCUMENTS

| | | | |
|---|---|---|---|
| 6,654,561 | B1 | 11/2003 | Terahara et al. |
| 9,276,696 | B2 | 3/2016 | Al Sayeed et al. |
| 2002/0048062 | A1 | 4/2002 | Sakamoto et al. |

(Continued)

FOREIGN PATENT DOCUMENTS

| JP | 2002-057624 A | 2/2002 |
|---|---|---|
| JP | 2008-042845 A | 2/2008 |

(Continued)

OTHER PUBLICATIONS

Pierluigi Poggiolini; "Analytical Modeling of Non-Linear Propagation in Coherent Systems"; OFC Mar. 21, 2013; Optical Society of America; 978-1-55752-962-6/13; www.optcom.polito.it (132 pages).

*Primary Examiner* — Hibret A Woldekidan
(74) *Attorney, Agent, or Firm* — STAAS & HALSEY LLP

(57) ABSTRACT

Optical transmission system transmits WDM signal from first node to second node via optical fiber. The optical transmission system includes: OCM that detects optical power of each wavelength channel in second node; processor that controls optical power of each wavelength channel based on detection by OCM in first node; optical circuit that adjusts optical power of each wavelength channel based on control signal from the processor in first node; and second processor that decides whether the optical powers of wavelength channels have converged to target level based on detection by OCM. When the optical powers of wavelength channels have not converged to the target level, the processor controls the optical circuit using the control signal in first cycle. When the optical powers of wavelength channels have converged to the target level, the processor controls the optical circuit using the control signal in second cycle longer than first cycle.

8 Claims, 17 Drawing Sheets

(58) Field of Classification Search
CPC .... H04B 10/43; H04B 10/50; H04B 10/0795; H04B 10/0793; H04B 10/077
See application file for complete search history.

(56) References Cited

U.S. PATENT DOCUMENTS

| | | | |
|---|---|---|---|
| 2008/0037991 A1 | 2/2008 | Sugawa et al. | |
| 2010/0322633 A1* | 12/2010 | Suzuki | H04B 10/672 398/160 |
| 2016/0094360 A1* | 3/2016 | Engelhardt | H04L 12/2807 709/220 |
| 2022/0368448 A1* | 11/2022 | Yamauchi | H04B 10/07955 |

FOREIGN PATENT DOCUMENTS

| | | |
|---|---|---|
| JP | 2010-045807 A | 2/2010 |
| JP | 2011-009864 A | 1/2011 |

* cited by examiner

OPTICAL TRANSMISSION SYSTEM AND OPTICAL TRANSMISSION DEVICE

CROSS-REFERENCE TO RELATED APPLICATION

This application is based upon and claims the benefit of priority of the prior Japanese Patent Application No. 2022-074218, filed on Apr. 28, 2022, the entire contents of which are incorporated herein by reference.

FIELD

The embodiments discussed herein are related to an optical transmission system and an optical transmission device that transmit a WDM signal.

BACKGROUND

Wavelength division multiplexing (WDM) has been put into practical use to provide large-capacity optical communication. The WDM transmits a signal by using a plurality of wavelength channels. Therefore, by multiplexing a large number of wavelength channels, large-capacity optical communication is achieved.

In an optical transmission system that transmits a WDM signal, a ROADM (Reconfigurable Optical Add-Drop Multiplexer) is implemented in each node in many cases. The ROADM includes a wavelength selective switch (WSS) and an optical amplifier circuit, and processes each wavelength channel of a WDM signal. The WSS branches an optical signal of a desired wavelength channel from the WDM signal, and inserts an optical signal into an empty wavelength channel of the WDM signal. The optical amplifier circuit amplifies the WDM signal output from the WSS. When it is not necessary to branch or insert an optical signal, a dynamic gain equalizer (DGE) may be provided instead of WSS.

The optical power of each wavelength channel of the WDM signal has wavelength dependency. Therefore, in order to suppress the influence of the wavelength dependency, pre-emphasis control and slope control may be performed. For example, the optical power of each wavelength channel is monitored at a reception node. A transmission node controls optical transmitting power of each wavelength channel based on a monitoring result obtained in the reception node. At this time, the transmission node controls the WSS and the optical amplifier circuit such that the output optical power of an optical fiber transmission line (that is, received optical power at the reception node) is flat with respect to a wavelength. Alternatively, the output optical power of a reception optical amplifier may be controlled to be flat with respect to the wavelength at the reception node. As a result, the received optical powers of wavelength channels at the reception node are flat with respect to the wavelength, and the quality of the WDM signal is improved.

Note that a WDM optical communication system that suppresses variations in transmission characteristics of optical signals of respective wavelengths based on received information such as an optical signal-to-noise ratio (OSNR) measured on a reception side has been proposed (for example, Japanese Laid-open Patent Publication No. 2002-057624).

As described above, the transmission node controls the optical power of each wavelength channel of the WDM signal based on information detected by the reception node. However, in a large-scale network, a large number of ROADMs are connected. Therefore, optical power control performed in one ROADM node may affect optical power control performed in another ROADM node. That is, optical power control of a plurality of ROAMD nodes may interfere with each other. For example, when a plurality of ROADM nodes respectively determine that "optical power needs to be increased" and the plurality of ROADM nodes increase optical power at the same time, the optical power may become too high. That is, unexpected large optical power fluctuation may occur.

SUMMARY

According to an aspect of the embodiments, an optical transmission system transmits a WDM (wavelength division multiplexed) signal from a first optical transmission device to a second optical transmission device via an optical fiber transmission line. The optical transmission system includes: an optical channel monitor that detects optical power of each wavelength channel of the WDM signal in the second optical transmission device; a processor that controls optical power of each wavelength channel of the WDM signal based on a detection result by the optical channel monitor in the first optical transmission device; an optical circuit that adjusts optical power of each wavelength channel of the WDM signal based on a control signal from the processor in the first optical transmission device; and a second processor that decides whether or not optical powers of wavelength channels of the WDM signal have converged to a target level based on a detection result by the optical channel monitor. When the optical powers of wavelength channels of the WDM signal have not converged to the target level, the processor controls the optical circuit using the control signal in a first cycle. When the optical powers of wavelength channels of the WDM signal have converged to the target level, the processor controls the optical circuit using the control signal in a second cycle longer than the first cycle.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
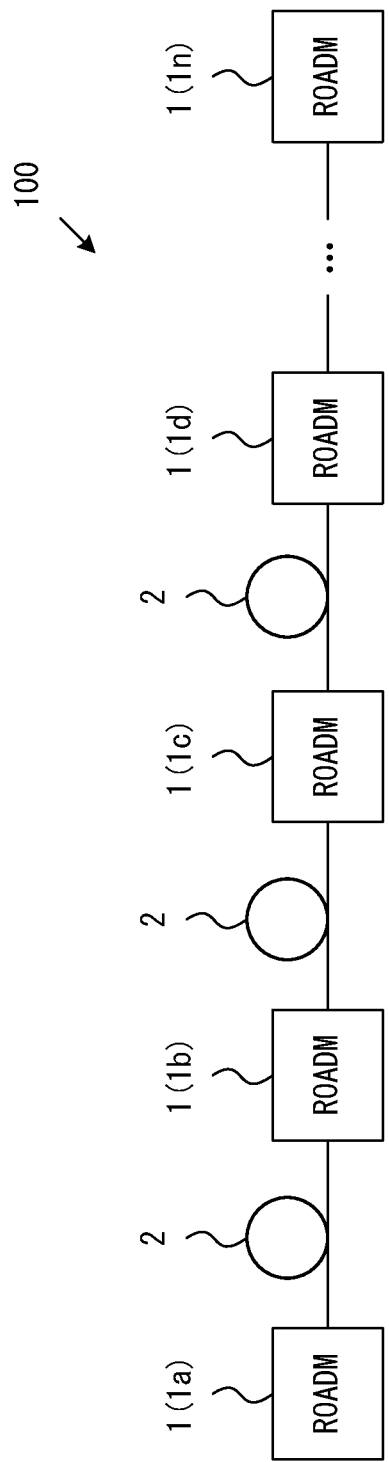
FIG. 1 illustrates an example of an optical communication network according to an embodiment of the present invention.

FIG. 1 illustrates an example of an optical communication network according to an embodiment of the present invention. An optical communication network 100 according to the embodiment of the present invention includes a plurality of ROADMs 1 (1a to 1n). The plurality of ROADMs 1 are connected by an optical fiber transmission line 2. Each ROADM 1 transmits a WDM signal. For example, a WDM signal generated by the ROADM 1a is transmitted to the ROADM 1n via the ROADMs 1b to 1d. Note that each ROADM 1 can branch an optical signal of a desired wavelength channel from the received WDM signal. In addition, each ROADM 1 can insert an optical signal into an empty wavelength channel of a WDM signal. ROADM is an example of an optical transmission device.

Figure 2:
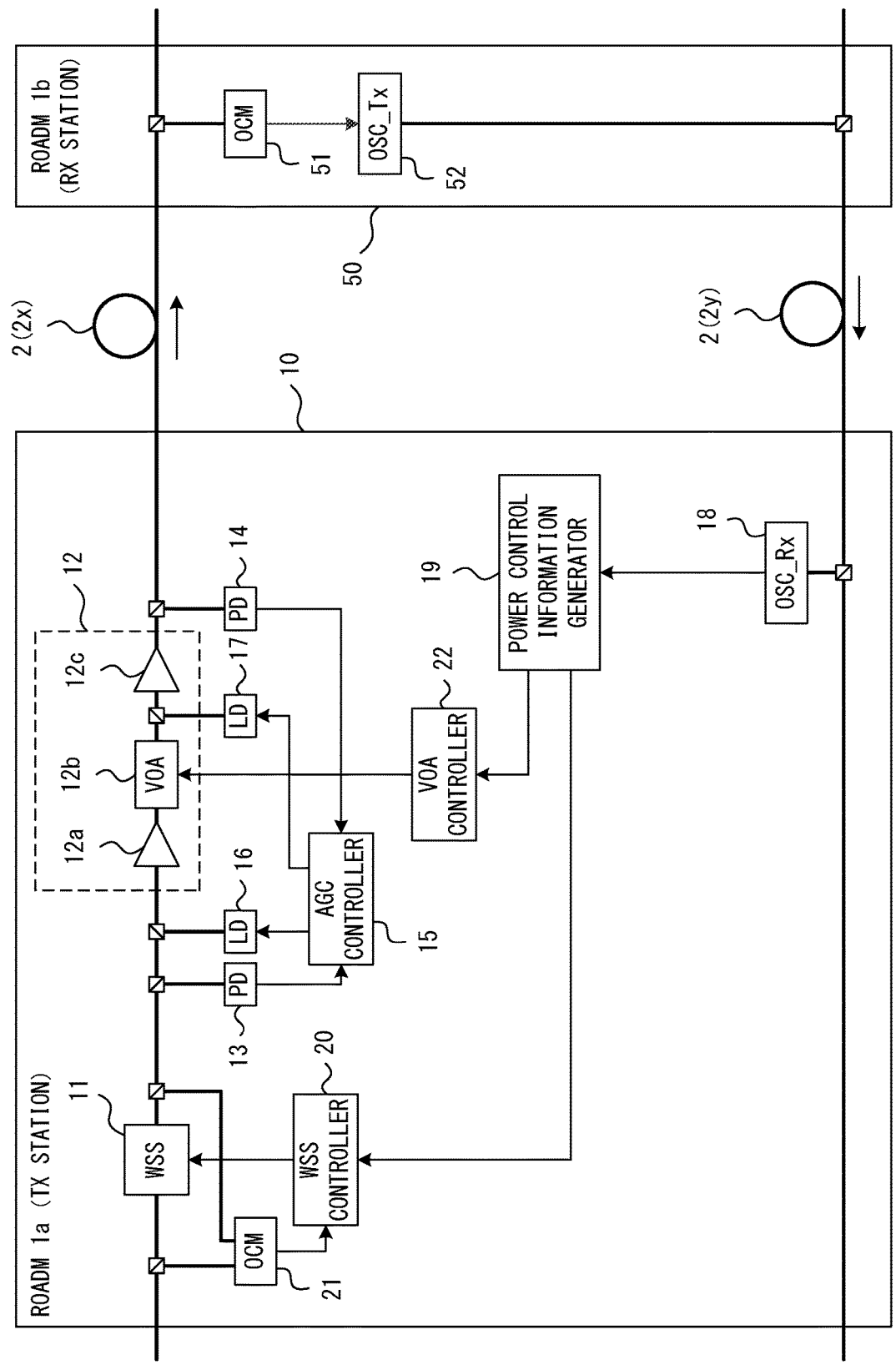
FIG. 2 illustrates an example of an optical transmission system.

FIG. 2 illustrates an example of an optical transmission system. The optical transmission system illustrated in FIG. 2 includes two ROADMs 1 adjacent to each other among the plurality of ROADMs 1 illustrated in FIG. 1. In the example illustrated in FIG. 2, the optical transmission system includes a ROADM 1a and a ROADM 1b. It is assumed that a WDM signal is transmitted from the ROADM 1a to the ROADM 1b via an optical fiber transmission line 2x. Therefore, in the following description, the ROADM 1a may be referred to as a "transmitter side station (TX station) 10". The ROADM 1b may be referred to as a "receiver side station (RX station) 50 (alternatively, the reception node)".

The transmitter side station 10 includes a WSS 11, an optical amplifier circuit 12, photo detectors (PDs) 13 and 14, an AGC controller 15, pump light sources (LDs) 16 and 17, an OSC receiver 18, a power control information generator 19, a WSS controller 20, an OCM 21, and a VOA controller 22. Note that the transmitter side station 10 may include other elements, circuits, or functions not illustrated in FIG. 2. The receiver side station 50 includes an OCM 51 and an OSC transmitter 52. Note that the receiver side station 50 may include other elements, circuits, or functions not illustrated in FIG. 2.

The WSS 11 adjusts the optical power of each wavelength channel of the WDM signal in accordance with an instruction given from the WSS controller 20. Note that the WSS 11 is an example of an optical circuit that controls the optical power of each wavelength channel of the WDM signal in accordance with an instruction given from the WSS controller 20. That is, the transmitter side station 10 may include, instead of the WSS 11, an optical circuit of another form that adjusts the optical power of each wavelength channel of the WDM signal.

The optical amplifier circuit 12 amplifies the WDM signal output from the WSS 11. In this example, the optical amplifier circuit 12 includes an optical amplifier 12a, a variable optical attenuator (VOA) 12b, and an optical amplifier 12c. The optical amplifier 12a amplifies the WDM signal output from the WSS 11. The VOA 12b attenuates the WDM signal output from the optical amplifier 12a. The optical amplifier 12c amplifies the WDM signal output from the VOA 12b. The optical amplifiers 12a and 12c are, for example, erbium-doped fiber amplifiers (EDFA).

The gains of the optical amplifiers 12a and 12c are determined by automatic gain control (AGC). That is, the photo detector 13 converts the WDM signal input to the optical amplifier circuit 12 into an electric signal. The photo detector 14 converts the WDM signal output from the optical amplifier circuit 12 into an electric signal. The AGC controller 15 controls the pump light sources 16 and 17 such that the gain of the optical amplifier circuit 12 for the WDM signal approaches a target value based on the output signal of the photo detector 13 and the output signal of the photo detector 14. Each of the pump light sources 16 and 17 generates pump light in accordance with a signal given from the AGC controller 15. Note that the pump light generated by the pump light source 16 is given to the optical amplifier 12a, and the pump light generated by the pump light source 17 is given to the optical amplifier 12c. The attenuation amount with respect to the WDM signal in the VOA 12b is controlled by the VOA controller 22.

The WDM signal output from the transmitter side station 10 propagates through the optical fiber transmission line 2x. The receiver side station 50 receives the WDM signal via the optical fiber transmission line 2x.

In the receiver side station 50, the OCM 51 detects optical power of each wavelength channel of the WDM signal. That is, the OCM 51 can detect the spectrum of the WDM signal received by the receiver side station 50. The OSC transmitter 52 transmits information indicating optical power detected by the OCM 51 to the transmitter side station 10 using an optical supervisory channel (OSC). The OSC is achieved by, for example, a specified wavelength channel provided separately from wavelength channels for transmitting data. In the following description, information indicating optical power detected by the OCM 51 may be referred to as "optical power information". In addition, the OSC is configured in an optical fiber transmission line 2y that transmits an optical signal from the receiver side station 50 to the transmitter side station 10.

In the transmitter side station 10, the OSC receiver 18 extracts the optical power information from the OSC. The optical power information is guided to the power control information generator 19.

The power control information generator 19 generates power control information based on the optical power information transmitted from the receiver side station 50. The power control information includes WSS loss information indicating a loss amount of each wavelength channel of the WDM signal and tilt information indicating a tilt of the WDM signal with respect to the wavelength. The WSS loss information is given to the WSS controller 20. Furthermore, the tilt information is given to the VOA controller 22.

The WSS controller 20 controls the WSS 11 in accordance with the WSS loss information. Here, the OCM 21 detects the optical power of each wavelength channel of the WDM signal input to the WSS 11 and the optical power of each wavelength channel of the WDM signal output from the WSS 11. The WSS controller 20 monitors the loss of each wavelength channel in the WSS 11 based on the measurement by the OCM 21. Then, the WSS controller 20 controls the WSS 11 such that the loss of each wavelength channel in the WSS 11 matches the loss amount indicated by the WSS loss information.

The VOA controller 22 controls the VOA 12b in accordance with the tilt information. Here, in a configuration in which the VOA 12b is provided between a set of optical amplifiers (12a, 12c), when optical power of a WDM signal is adjusted using the VOA 12b while AGC control is performed on the optical amplifiers 12a and 12c, tilt of the WDM signal received by the receiver side station 50 changes. Therefore, by controlling the VOA 12b based on the optical power information generated in the receiver side station 50, the optical powers of wavelength channels of the WDM signal received by the receiver side station 50 can be made flat.

Figure 3A:
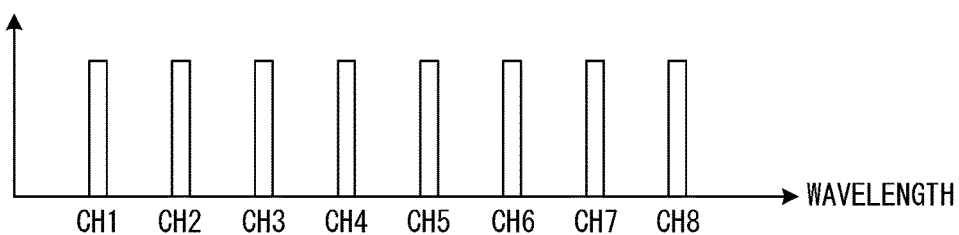
FIGS. 3A-3E illustrate an example of optical transmitting power control.

FIGS. 3A-3E illustrate an example of optical transmitting power control. In this example, the WDM signal includes wavelength channels CH1-CH8. Then, it is assumed that as illustrated in FIG. 3A, when the optical powers of the wavelength channels CH1-CH8 transmitted from the transmitter side station 10 are the same, the WDM signal illustrated in FIG. 3B arrives at the receiver side station 50.

Figure 3B:
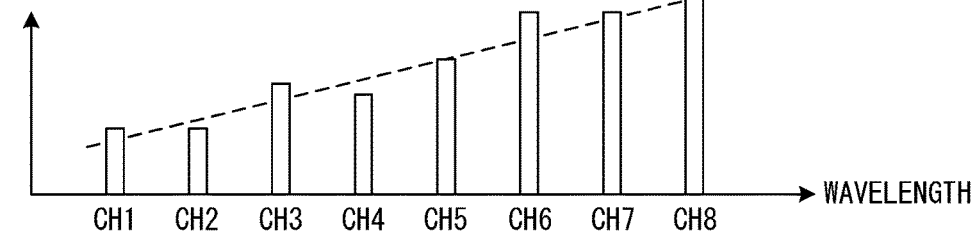

In this case, the receiver side station 50 monitors the WDM signal using the OCM 51, thereby obtaining the optical power information illustrated in FIG. 3B. Then, the power control information generator 19 of the transmitter side station 10 acquires the optical power information from the receiver side station 50.

Figure 3C:
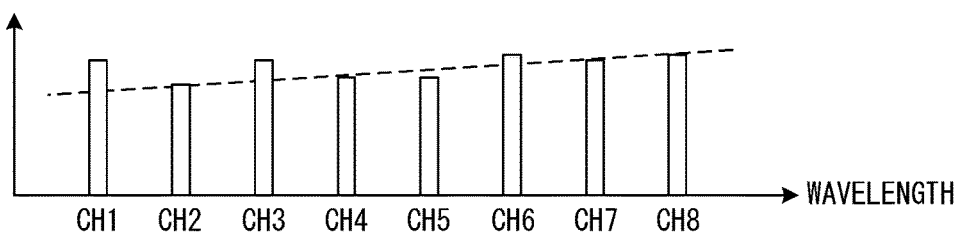

The power control information generator 19 generates power control information based on the optical power information received from the receiver side station 50. Specifically, the power control information generator 19 generates tilt information for making the tilt (that is, inclination) of the WDM signal with respect to the wavelength close to flat. Here, when the optical power of the WDM signal is adjusted using the VOA 12b, the tilt of the WDM signal received by the receiver side station 50 changes. That is, as illustrated in FIG. 3C, the power control information generator 19 can make the tilt of the WDM signal received by the receiver side station 50 close to flat.

Figure 3D:
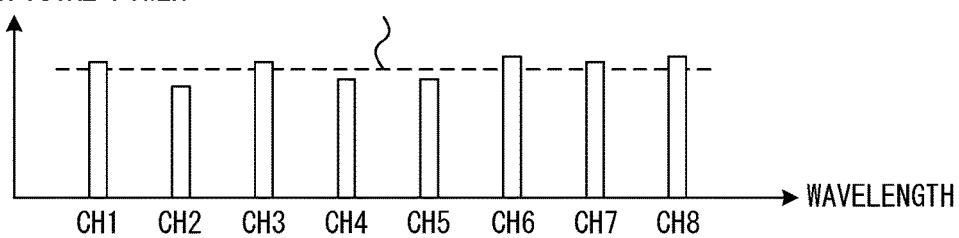

However, when only the tilt of the WDM signal is controlled, the optical power of the wavelength channels CH1-CH8 of the WDM signal received by the receiver side station 50 may vary as illustrated in FIG. 3D. Therefore, the variation in the optical powers of wavelength channels is compensated for by using the WSS 11. That is, the power control information generator 19 generates WSS loss information for controlling the loss of each wavelength channel in the WSS 11 based on the optical power information.

Figure 3E:
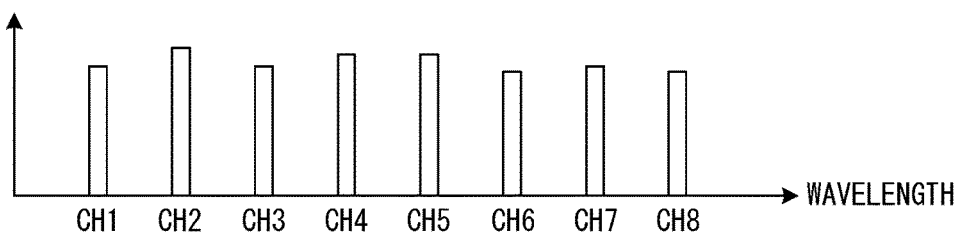

For example, in the example illustrated in FIG. 3D, the received optical powers of the wavelength channels CH1, CH3, and CH6 to CH8 are larger than the average power, and the received optical powers of the wavelength channels CH2, CH4, and CH5 are smaller than the average power. In this case, the power control information generator 19 generates WSS control information that increases the losses of the wavelength channels CH1, CH3, and CH6 to CH8 and decreases the losses of the wavelength channels CH2, CH4, and CH5. Then, the WSS 11 controls the optical power of each wavelength channel in accordance with the WSS control information. As a result, the optical power of each wavelength channel of the WDM signal output from the WSS 11 is adjusted as illustrated in FIG. 3E.

In this manner, the transmitter side station 10 controls the loss of each wavelength channel in the WSS 11 and the attenuation amount of the VOA 12b based on the optical power information received from the receiver side station 50. As a result, the optical powers of wavelength channels of the WDM signal received by the receiver side station 50 are equalized, and the quality of each wavelength channel is stabilized.

Note that it is also possible to make the optical powers of wavelength channels of the received WDM signal equalized by using only the WSS 11 without using the VOA 12b. However, in this case, the loss increases in the WSS 11, and the OSNR tends to decrease. On the other hand, in the method of controlling the tilt of the WDM signal with respect to the wavelength by adjusting the attenuation amount of the VOA 12b, the degradation of the OSNR is suppressed. Therefore, as illustrated in FIG. 2, a configuration in which the optical powers of wavelength channels of the received WDM signal are made equalized by controlling the WSS 11 and the VOA 12b is preferable.

Meanwhile, the power control information generator 19 controls optical transmitting power of each wavelength channel of the WDM signal at a specified cycle, for example. However, when a control cycle is too short, optical power control of a plurality of ROAMD nodes may interfere with each other. For example, in a case where a WDM signal is transmitted from the ROADM 1a to the ROADM 1n illustrated in FIG. 1, transmission power control by the ROADM 1a that equalizes a received WDM signal of the ROADM 1b, transmission power control by the ROADM 1b that equalizes a received WDM signal of the ROADM 1c, and transmission power control by the ROADM 1c that equalizes a received WDM signal of the ROADM 1d affect each other, and thus, there is a possibility that unexpected large optical power fluctuation occurs. On the other hand, when the control cycle is too long, the time until the received WDM signal is equalized in each ROADM node becomes longer when the transmission condition changes. In this case, there is a possibility that the quality of some wavelength channels continues to be low over a long cycle. The optical transmission device or the optical transmission system according to the embodiments of the present invention alleviates this trade-off.

Figure 4:
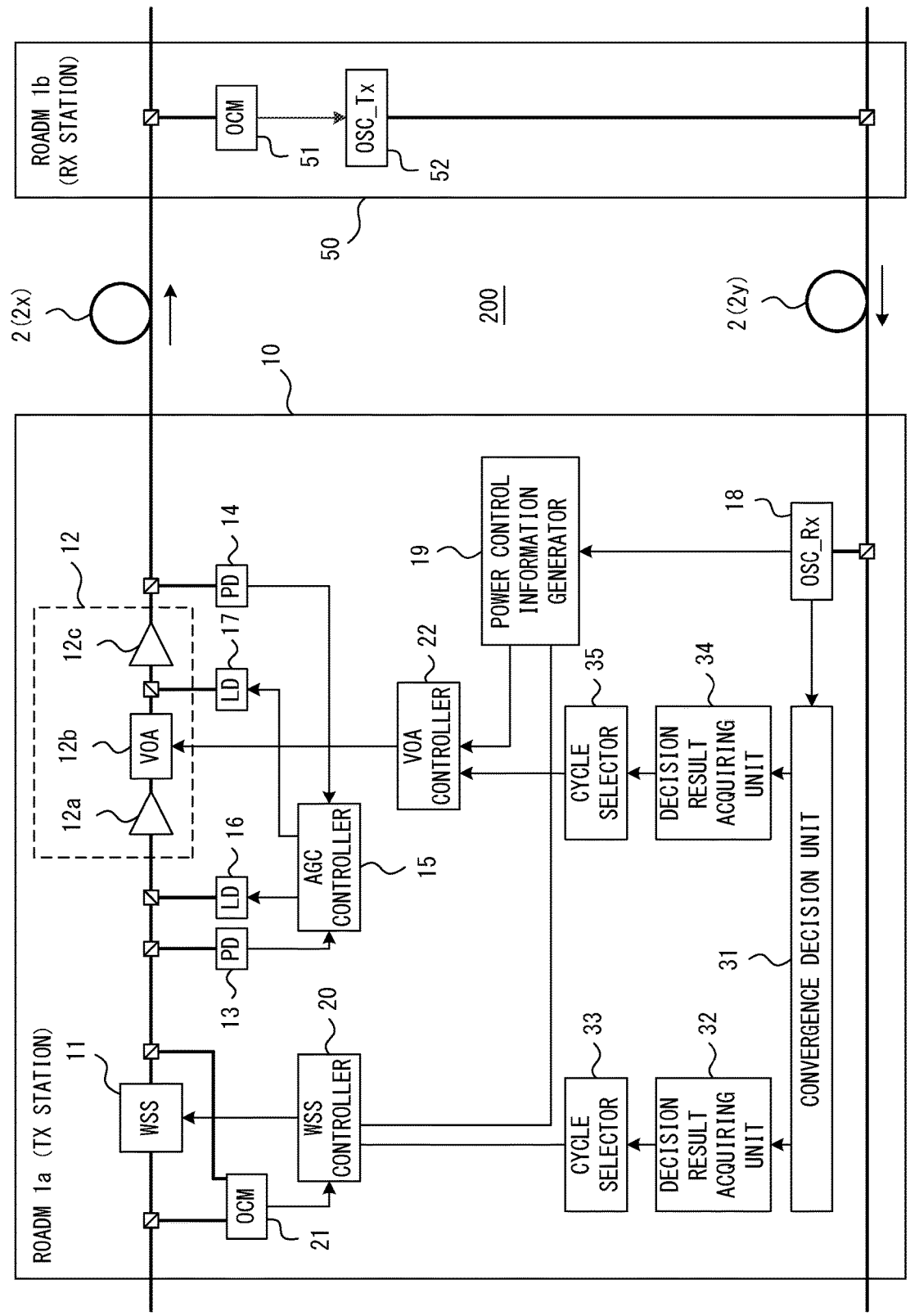
FIG. 4 illustrates an example of an optical transmission system according to an embodiment of the present invention.

FIG. 4 illustrates an example of an optical transmission system according to an embodiment of the present invention. An optical transmission system 200 according to an embodiment of the present invention includes two ROADMs adjacent to each other among a plurality of ROADMs 1 illustrated in FIG. 1. In the example illustrated in FIG. 4, the optical transmission system 200 includes a ROADM 1a and a ROADM 1b. A WDM signal is transmitted from the ROADM 1a to the ROADM 1b via the optical fiber transmission line 2x. Therefore, in the following description, the ROADM 1a may be referred to as a "transmitter side station (TX station) 10". The ROADM 1b may be referred to as a "receiver side station (RX station) 50 (alternatively, the reception node)".

In the transmitter side station 10, the WSS 11 and the optical amplifier circuit 12 are an example of an optical circuit that adjusts the optical power of each wavelength channel of the WDM signal based on the control signals given from the WSS controller 20 and the VOA controller 22. In this case, the WSS controller 20 and the VOA controller 22 are an example of a controller that generates a control signal for controlling the optical power of each wavelength channel of the WDM signal based on the detection result by the OCM 51 provided in the receiver side station 50.

The configuration of the optical transmission system is substantially the same in FIGS. 2 and 4. However, in the optical transmission system 200 according to the embodiment of the present invention, the transmitter side station 10 includes a convergence decision unit 31, a decision result acquiring unit 32, a cycle selector 33, a decision result acquiring unit 34, and a cycle selector 35 in addition to the configuration illustrated in FIG. 2.

The convergence decision unit 31 decides whether or not a control system that controls the optical transmitting power of the WDM signal has converged based on the optical power information indicating the optical power of each wavelength channel of the WDM signal received by the receiver side station 50. At this time, the convergence decision unit 31 decides whether or not the optical power of each wavelength channel has converged to a target level based on the optical power information. Here, the optical power of each wavelength channel of the WDM signal received by the receiver side station 50 is detected by the OCM 51. The optical power information is transmitted from the receiver side station 50 to the transmitter side station 10 using OSC. Then, the convergence decision unit 31 extracts the optical power information from the OSC to recognize the optical power of each wavelength channel of the WDM signal received by the receiver side station 50.

Figure 5:
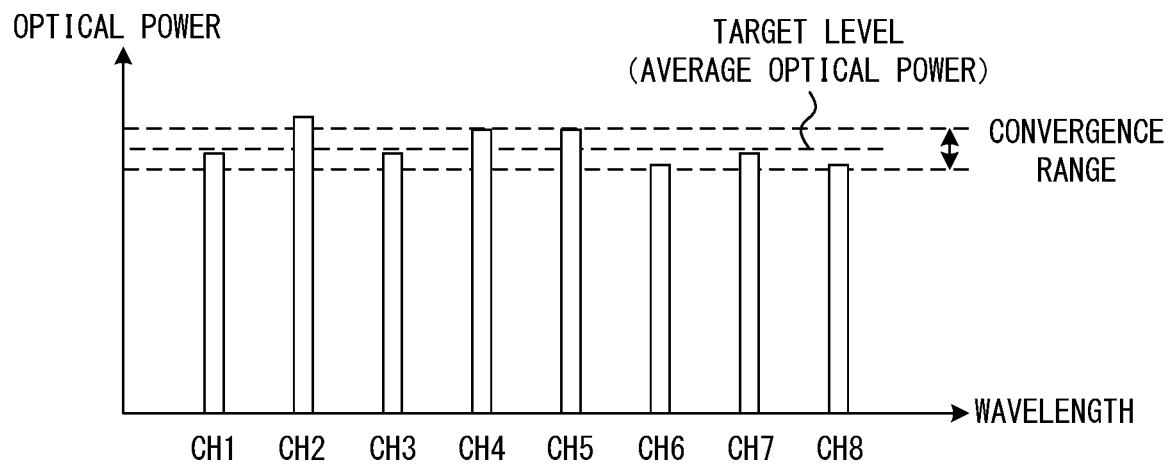
FIG. 5 illustrates an example of a convergence decision.

FIG. 5 illustrates an example of a convergence decision. Here, FIG. 5 illustrates optical powers of wavelength channels of the WDM signal received by the receiver side station 50. The target level is an average of the optical powers of wavelength channels in this example. The convergence range is set by adding a specified margin to the target level.

The convergence decision unit 31 decides whether or not the optical power of each wavelength channel is within the convergence range. In the example illustrated in FIG. 5, the optical power of the wavelength channel CH2 is larger than the upper limit value of the convergence range. Therefore, in this case, the convergence decision unit 31 decides that the optical powers of wavelength channels have not converged to the target level. That is, the convergence decision unit 31 decides that the control system that controls the optical transmitting power of the WDM signal has not yet converged. Note that the convergence decision unit 31 performs convergence decision at a specified cycle (for example, about 1 to 5 seconds).

In the example illustrated in FIGS. 4 and 5, the convergence decision unit 31 monitors the optical power of each wavelength channel of the received WDM signal, but the present invention is not limited to this configuration. For example, when each node includes a reception optical amplifier that amplifies the received WDM signal, the convergence decision unit 31 may monitor the optical power of each wavelength channel of the WDM signal output from the reception optical amplifier.

The decision result acquiring unit 32 acquires a decision result by the convergence decision unit 31. Then, when the decision result changes, the decision result acquiring unit 32 transmits a switching request to the cycle selector 33. Specifically, when a state of the control system changes from a converged state to a non-converged state, the decision result acquiring unit 32 requests the cycle selector 33 to switch from a low-speed mode to a high-speed mode. When the state of the control system changes from the non-converged state to the converged state, the decision result acquiring unit 32 requests the cycle selector 33 to switch from the high-speed mode to the low-speed mode.

The cycle selector 33 controls the operation cycle of the WSS controller 20 in accordance with a request from the decision result acquiring unit 32. For example, when receiving a request to switch from the low-speed mode to the high-speed mode, the cycle selector 33 operates the WSS controller 20 in a first cycle (for example, 10 seconds). When receiving a request to switch from the high-speed mode to the low-speed mode, the cycle selector 33 operates the WSS controller 20 in a second cycle (for example, 10 minutes) longer than the first cycle. Then, the WSS controller 20 controls the WSS 11 at the cycle selected by the cycle selector 33.

The operations of the decision result acquiring unit 34 and the cycle selector 35 are substantially the same as the operations of the decision result acquiring unit 32 and the cycle selector 33. That is to say, when the decision result changes, the decision result acquiring unit 34 transmits a switching request to the cycle selector 35. Then, the cycle selector 35 controls the operation cycle of the VOA controller 22 in accordance with a request from the decision result acquiring unit 34. The VOA controller 22 controls the VOA 12b at the cycle selected by the cycle selector 35.

As described above, in the optical transmission system 200, when the optical powers of wavelength channels of the WDM signal received by the receiver side station 50 have not converged to the target level, the high-speed mode is selected, and the frequency of a process to adjust the optical transmitting power of the WDM signal increases. Therefore, even when the transmission condition of the optical transmission system 200 changes, the time until the received WDM signal is equalized in each ROADM node is short. When the optical powers of wavelength channels of the WDM signal received by the receiver side station 50 have converged to the target level, the low-speed mode is selected, and the frequency of a process to adjust the optical transmitting power of the WDM signal decreases. Therefore, the optical power control by the plurality of ROAMD nodes hardly interferes with each other, and unexpected optical power fluctuation is suppressed.

Note that the WSS controller 20 and the VOA controller 22 preferably operate in cooperation with each other. For example, the WSS controller 20 and the VOA controller 22 may alternately control the corresponding optical circuits.

In addition, in the example illustrated in FIG. 4, the ROADM provided in each node includes WSS, but the present invention is not limited to this configuration. That is, it suffices that the optical transmission device that transmits the WDM signal includes a channel power adjustment device for adjusting the optical power of each wavelength channel of the WDM signal. Here, the WSS is an example of a channel power adjustment device. In addition, a DGE may be used as the channel power adjustment device.

Figure 6:
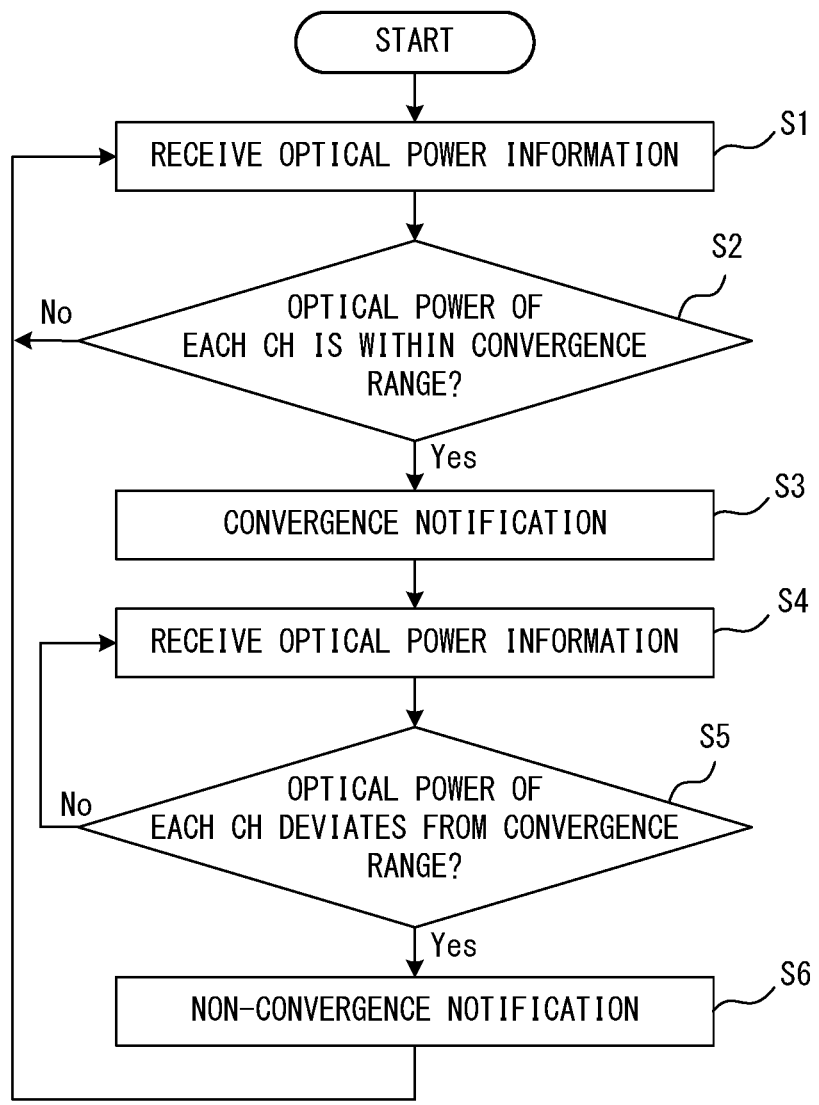
FIG. 6 is a flowchart illustrating an example of a process of a convergence decision unit.

FIG. 6 is a flowchart illustrating an example of a process performed by the convergence decision unit 31. The process of this flowchart is periodically or continuously executed while the ROADM 1 is operating. At the start of this flowchart, the control system that controls the optical transmitting power of the WDM signal is assumed to operate in the high-speed mode.

In S1, the convergence decision unit 31 receives the optical power information generated in the receiver side station 50. As described above, the optical power information indicates the optical power of each wavelength channel of the WDM signal received by the receiver side station 50.

In S2, the convergence decision unit 31 decides whether or not the optical power of each wavelength channel is within the convergence range. The convergence range is as described with reference to FIG. 5. Here, when the optical powers of wavelength channels have not converged within the convergence range, the process of the convergence decision unit 31 returns to S1. Therefore, during the period until the optical powers of wavelength channels converge within the convergence range, the control system that controls the optical transmitting power of the WDM signal operates in the high-speed mode. Then, when the optical powers of all of the wavelength channels have converged within the convergence range, the convergence decision unit 31 transmits a convergence notification to the decision result acquiring units 32 and 34 in S3. As will be described later, when the convergence decision unit 31 issues the convergence notification, the operation mode of the control system that controls the optical transmitting power of the WDM signal is switched from the high-speed mode to the low-speed mode.

In S4, the convergence decision unit 31 receives the optical power information. In S5, the convergence decision unit 31 decides whether or not the optical power of one or more wavelength channels deviates from the convergence range. Here, if the optical powers of wavelength channels have converged within the convergence range, the process of the convergence decision unit 31 returns to S4. That is, during a period in which the optical powers of wavelength channels converge within the convergence range, the control system that controls the optical transmitting power of the WDM signal operates in the low-speed mode. Then, when the optical power of one or more wavelength channels deviates from the convergence range, the convergence decision unit 31 transmits a non-convergence notification to the decision result acquiring units 32 and 34 in S6. As will be described later, when the convergence decision unit 31 issues the non-convergence notification, the operation mode of the control system that controls the optical transmitting power of the WDM signal is switched from the low-speed mode to the high-speed mode.

Figure 7:
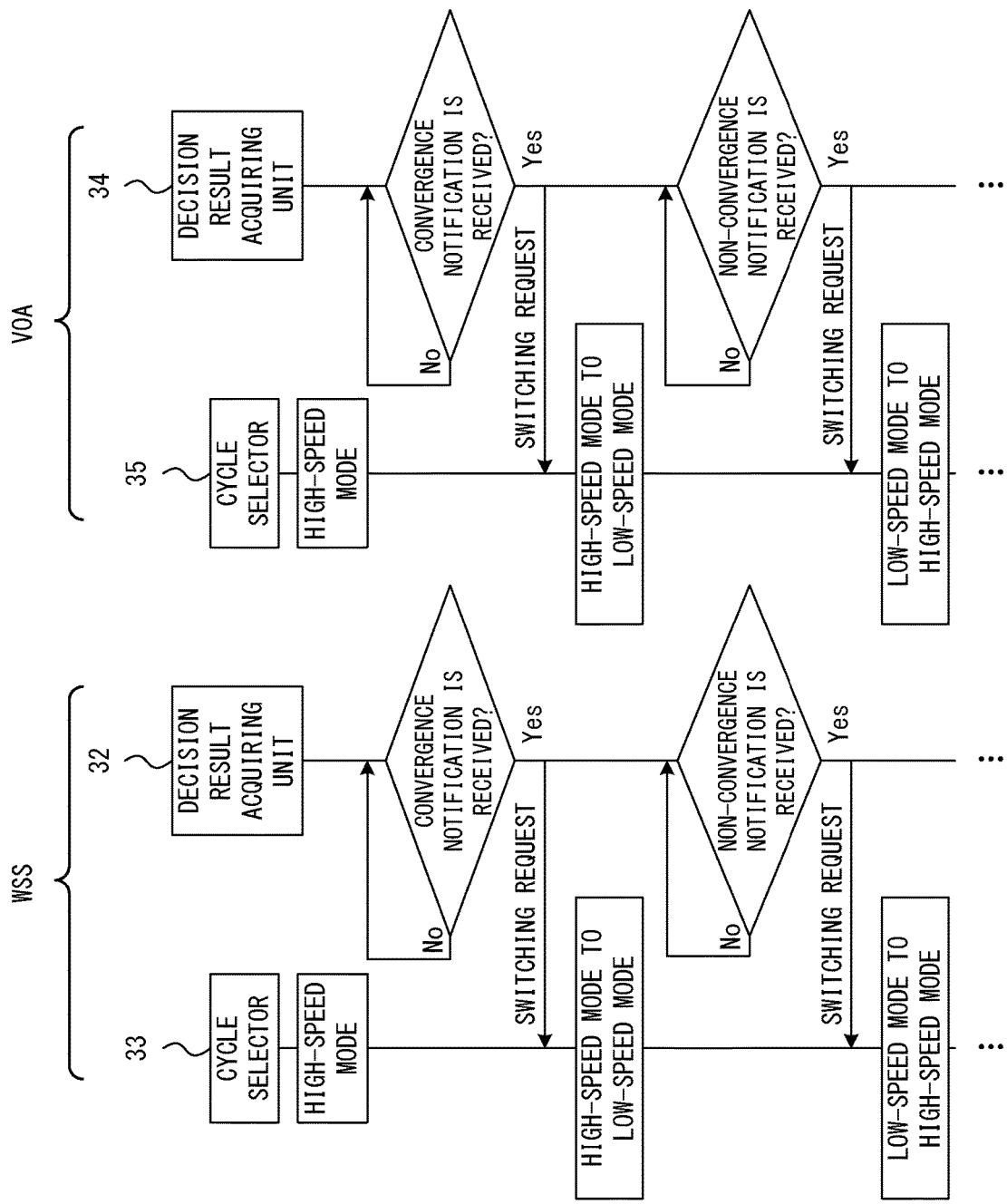
FIG. 7 is a sequence diagram illustrating an example of a process of a decision result acquiring unit and a cycle selector.

FIG. 7 is a sequence diagram illustrating an example of a process performed by the decision result acquiring unit and the cycle selector. In this example, the cycle selector 33 and 35 select the high-speed mode when the ROADM 1 starts operating. That is, the control system that controls the optical transmitting power of the WDM signal starts operation in the high-speed mode.

The decision result acquiring unit 32, 34 waits for the notification transmitted from the convergence decision unit 31. When the convergence decision unit 31 issues a convergence notification in S3 illustrated in FIG. 6, the decision result acquiring units 32 and 34 transmit switching requests to the cycle selectors 33 and 35, respectively. This switching request requests switching from the high-speed mode to the low-speed mode.

When receiving this switching request, the cycle selector 33 switches the operation mode of the WSS controller 20 from the high-speed mode to the low-speed mode. That is, the cycle selector 33 gives an instruction indicating that the WSS 11 is controlled in the second cycle to the WSS controller 20. Similarly, when receiving the switching request, the cycle selector 35 switches the operation mode of the VOA controller 22 from the high-speed mode to the low-speed mode. That is, the cycle selector 35 gives an instruction indicating that the VOA 12*b* is controlled in the second cycle to the VOA controller 22.

Subsequently, the decision result acquiring unit 32, 34 waits for the notification transmitted from the convergence decision unit 31. When the convergence decision unit 31 issues a non-convergence notification in S6 illustrated in FIG. 6, the decision result acquiring units 32 and 34 transmit switching requests to the cycle selectors 33 and 35, respectively. This switching request requests switching from the low-speed mode to the high-speed mode.

When receiving this switching request, the cycle selector 33 switches the operation mode of the WSS controller 20 from the low-speed mode to the high-speed mode. That is, the cycle selector 33 gives an instruction indicating that the WSS 11 is controlled in the first cycle shorter than the second cycle to the WSS controller 20. Similarly, when receiving the switching request, the cycle selector 35 switches the operation mode of the VOA controller 22 from the low-speed mode to the high-speed mode. That is, the cycle selector 35 gives an instruction indicating that the VOA 12*b* is controlled in the first cycle to the VOA controller 22.

Figure 8:
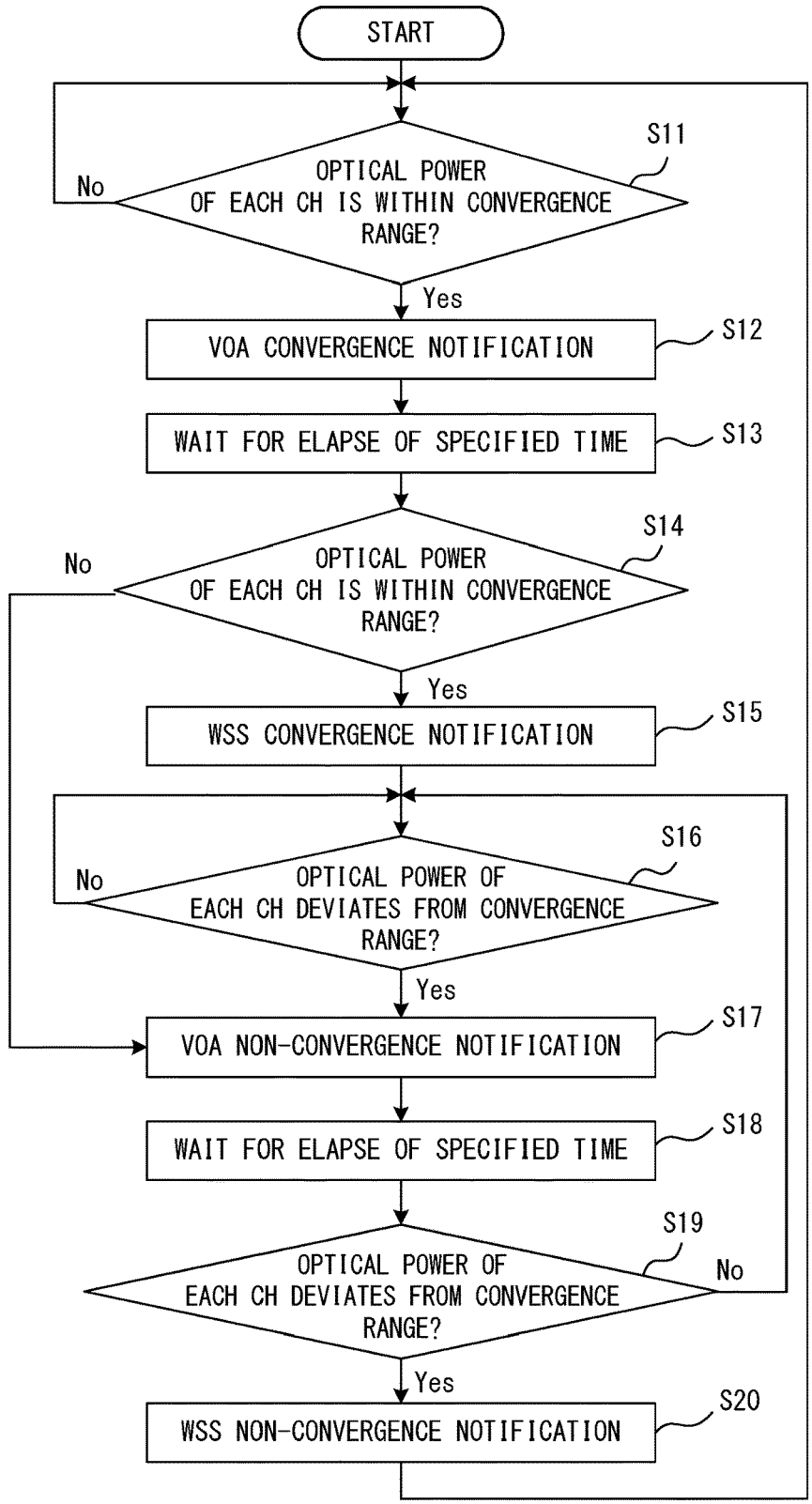
FIG. 8 is a flowchart illustrating a variation of a process of the convergence decision unit.

FIG. 8 is a flowchart illustrating a variation of a process performed by the convergence decision unit 31. In the procedure illustrated in FIG. 6, the control cycle of the WSS 11 and the control cycle of the VOA 12*b* are simultaneously switched. On the other hand, in the procedure illustrated in FIG. 8, the timing of switching the control cycle of the WSS 11 and the timing of switching the control cycle of the VOA 12*b* are different from each other. Note that, in the flowchart illustrated in FIG. 8, the process in which the convergence decision unit 31 receives the optical power information is omitted.

In S11, the convergence decision unit 31 decides whether or not the optical power of each wavelength channel is within the convergence range. When the optical power of each wavelength channel is within the convergence range, the convergence decision unit 31 issues a VOA convergence notification in S12. When the convergence decision unit 31 issues the VOA convergence notification, the operation mode of the VOA controller 22 is switched from the high-speed mode to the low-speed mode. Thereafter, the convergence decision unit 31 waits for the elapse of a specified time in S13.

In S14, the convergence decision unit 31 decides whether or not the optical power of each wavelength channel is within the convergence range. That is, it is decided whether or not the optical power of each wavelength channel is held within the convergence range in a situation where the VOA 12*b* is controlled in the low-speed mode. Then, when the optical power of each wavelength channel is held within the convergence range, the convergence decision unit 31 issues a WSS convergence notification in S15. When the convergence decision unit 31 issues the WSS convergence notification, the operation mode of the WSS controller 20 is switched from the high-speed mode to the low-speed mode.

In S16, the convergence decision unit 31 decides whether or not the optical power of one or more wavelength channels deviates from the convergence range. When the optical power of one or more wavelength channels deviates from the convergence range, the convergence decision unit 31 issues a VOA non-convergence notification in S17. When the convergence decision unit 31 issues the VOA non-convergence notification, the operation mode of the VOA controller 22 is switched from the low-speed mode to the high-speed mode. Thereafter, the convergence decision unit 31 waits for the elapse of a specified time in S18. Note that, also when it is decided in S14 that the optical power of one or more wavelength channels deviates from the convergence range, the convergence decision unit 31 issues the VOA non-convergence notification in S17.

In S19, the convergence decision unit 31 decides whether or not the optical power of one or more wavelength channels deviates from the convergence range. That is, it is decided whether or not the optical power of one or more wavelength channels deviates from the convergence range in a situation where the VOA 12b is controlled in the high-speed mode. When the optical power of one or more wavelength channels deviates from the convergence range, the convergence decision unit 31 issues a WSS non-convergence notification in S20. When the convergence decision unit 31 issues the WSS non-convergence notification, the operation mode of the WSS controller 20 is switched from the low-speed mode to the high-speed mode.

Figure 9:
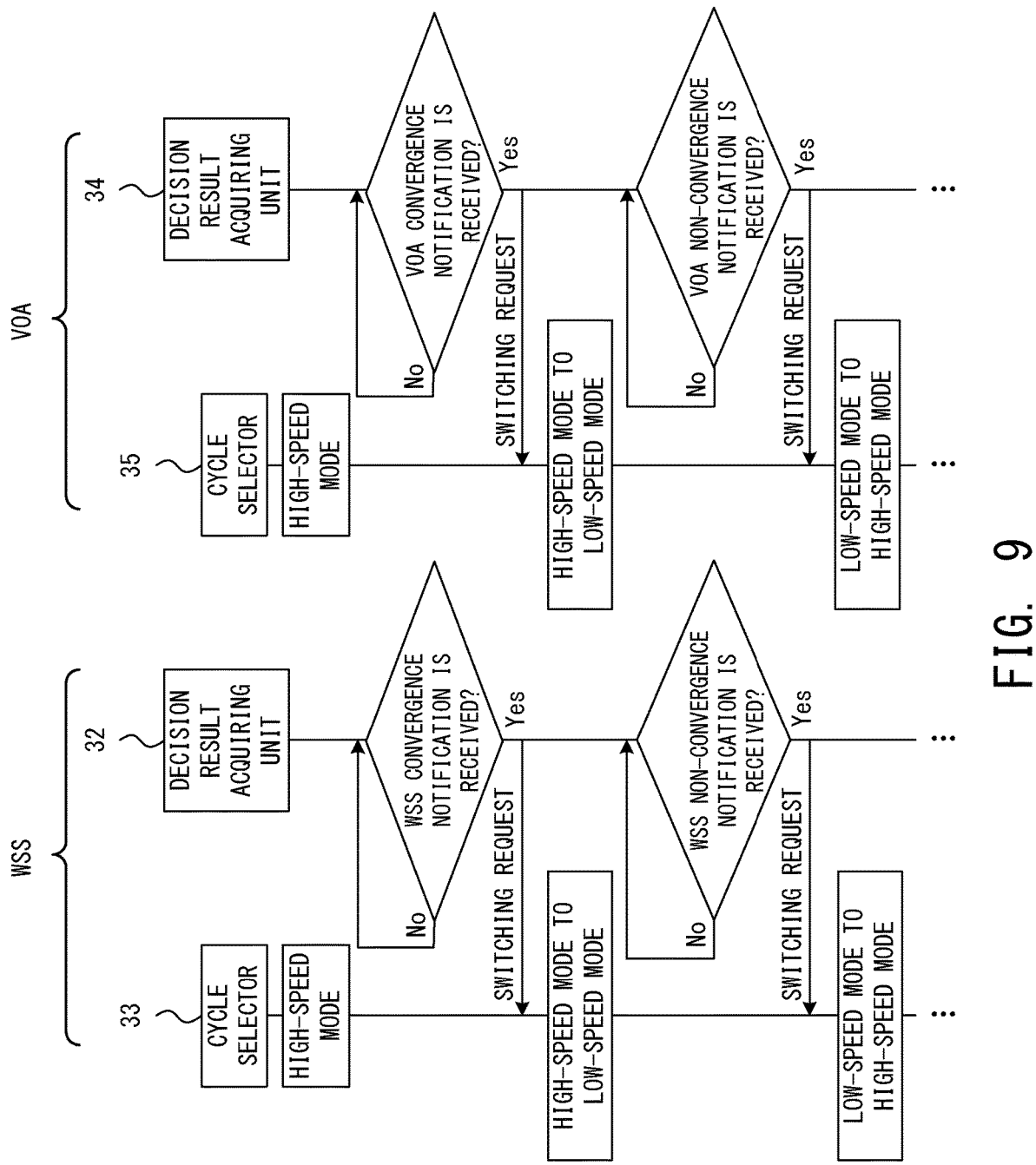
FIG. 9 is a sequence diagram illustrating an example of a process of a decision result acquiring unit and a cycle selector when the convergence decision unit executes the procedure illustrated in FIG. 8.

When the convergence decision unit 31 executes the process illustrated in FIG. 8, the decision result acquiring unit and the cycle selector execute the process illustrated in FIG. 9. The procedure illustrated in FIG. 7 and the procedure illustrated in FIG. 9 are substantially the same. However, the decision result acquiring unit 34 and the cycle selector 35 switch the operation mode of the VOA controller 22 from the high-speed mode to the low-speed mode when the VOA convergence notification is issued in S12, and switch the operation mode of the VOA controller 22 from the low-speed mode to the high-speed mode when the VOA non-convergence notification is issued in S17. In addition, the decision result acquiring unit 32 and the cycle selector 33 switch the operation mode of the WSS controller 20 from the high-speed mode to the low-speed mode when the WSS convergence notification is issued in S15, and switch the operation mode of the WSS controller 20 from the low-speed mode to the high-speed mode when the WSS non-convergence notification is issued in S20.

Figure 10B:
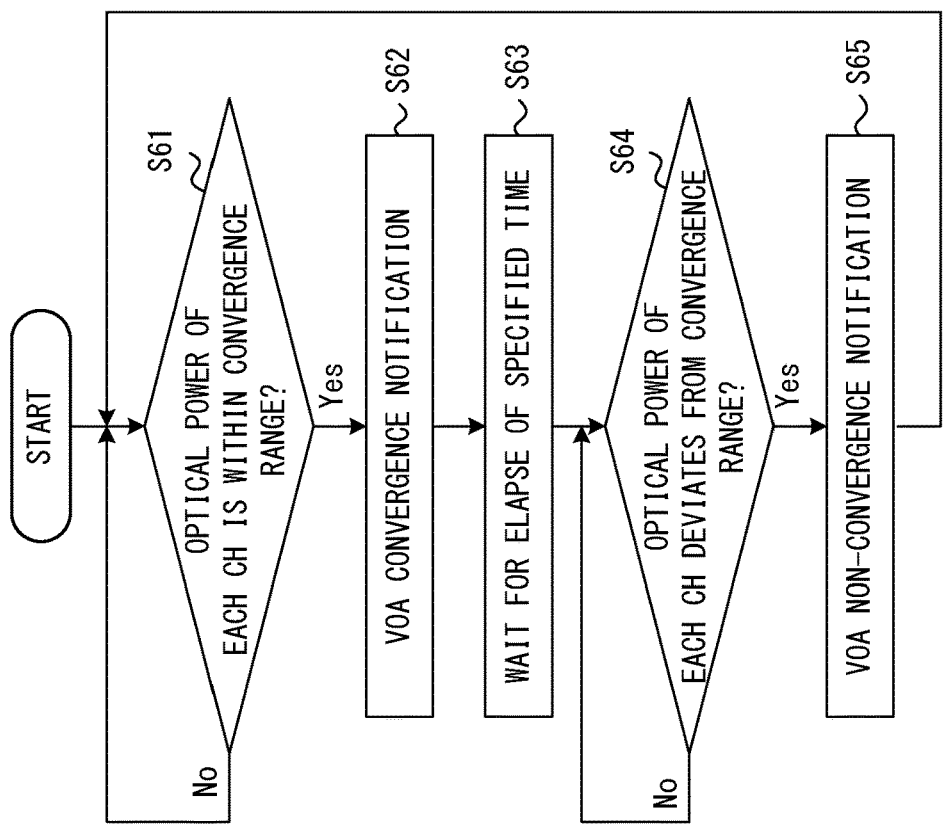
FIGS. 10A and 10B are flowcharts illustrating still another variation of the process of the convergence decision unit.
Figure 10A:
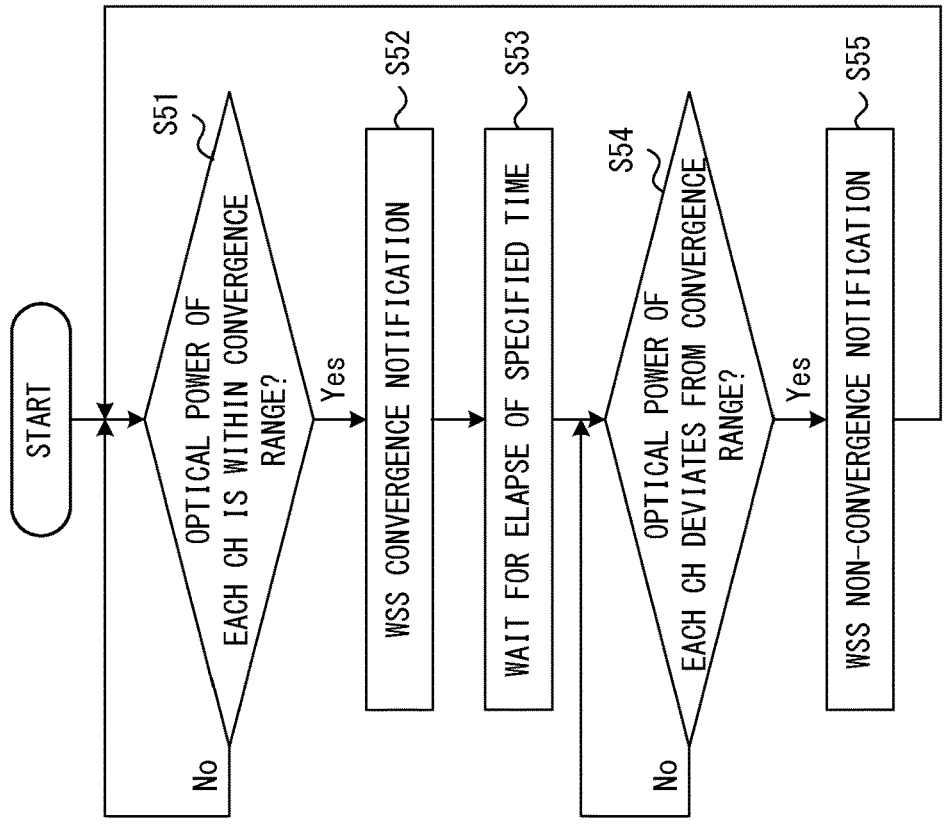

FIGS. 10A and 10B are flowcharts illustrating still another variation of the process performed by the convergence decision unit 31. In the example illustrated in FIGS. 8 and 9, switching of the control cycle of the WSS 11 and switching of the control cycle of the VOA 12b are interlocked with each other. On the other hand, in the example illustrated in FIGS. 10A and 10B, the control cycle of the WSS 11 and the control cycle of the VOA 12b are switched independently of each other.

The control cycle of the WSS 11 is controlled in accordance with S51-S55 of the flowchart illustrated in FIG. 10A. When the optical power of each wavelength channel is within the convergence range, the convergence decision unit 31 issues a WSS convergence notification. In addition, when the optical power of one or more wavelength channels deviates from the convergence range, the convergence decision unit 31 issues a WSS non-convergence notification. The operations of the decision result acquiring unit 32 and the cycle selector 33 are as illustrated in FIG. 9. Therefore, when the convergence decision unit 31 issues the WSS convergence notification, the operation mode of the WSS controller 20 is switched from the high-speed mode to the low-speed mode. When the convergence decision unit 31 issues the WSS non-convergence notification, the operation mode of the WSS controller 20 is switched from the low-speed mode to the high-speed mode.

The control cycle of the VOA 12b is controlled in accordance with S61-S65 of the flowchart illustrated in FIG. 10B. That is, when the optical power of each wavelength channel is within the convergence range, the convergence decision unit 31 issues a VOA convergence notification. In addition, when the optical power of one or more wavelength channels deviates from the convergence range, the convergence decision unit 31 issues a VOA non-convergence notification. The operations of the decision result acquiring unit 34 and the cycle selector 35 are as illustrated in FIG. 9. Therefore, when the convergence decision unit 31 issues the VOA convergence notification, the operation mode of the VOA controller 22 is switched from the high-speed mode to the low-speed mode. When the convergence decision unit 31 issues the VOA non-convergence notification, the operation mode of the VOA controller 22 is switched from the low-speed mode to the high-speed mode. Note that the convergence decision unit 31 can independently execute the process illustrated in FIG. 10A and the process illustrated in FIG. 10B.

Variations of Configuration

In the configuration illustrated in FIG. 4, the transmitter side station 10 has a function of generating power control information (including WSS loss information and tilt information) and a function of deciding convergence of a control system, but the embodiment of the present invention is not limited to this configuration. For example, the optical transmission system according to the embodiment of the present invention may have the configurations illustrated in FIGS. 11-13.

Figure 11:
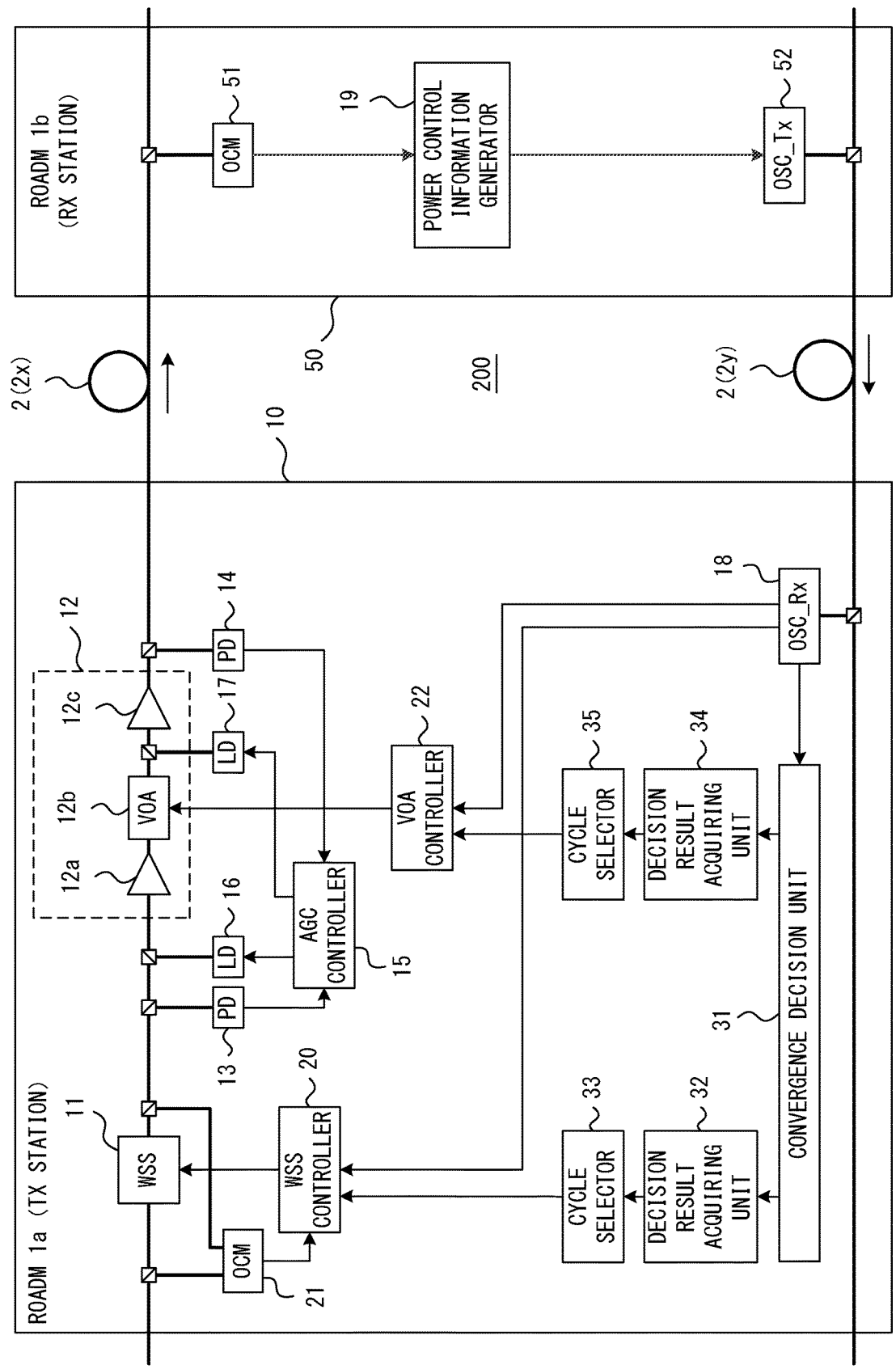
FIG. 11 illustrates a first variation of the optical transmission system according to the embodiment of the present invention.

In the configuration illustrated in FIG. 11, the receiver side station 50 includes a power control information generator 19. In this case, the power control information is generated in the receiver side station 50. The receiver side station 50 transmits power control information to the transmitter side station 10 in addition to optical power information indicating optical power of each wavelength channel of the WDM signal received by the receiver side station 50. Then, the transmitter side station 10 controls the optical transmitting power of each wavelength channel of the WDM signal based on the optical power information and the power control information received from the receiver side station 50. However, the decision as to whether or not the control system has converged is performed by the convergence decision unit 31 provided on the transmitter side station 10.

Figure 12:
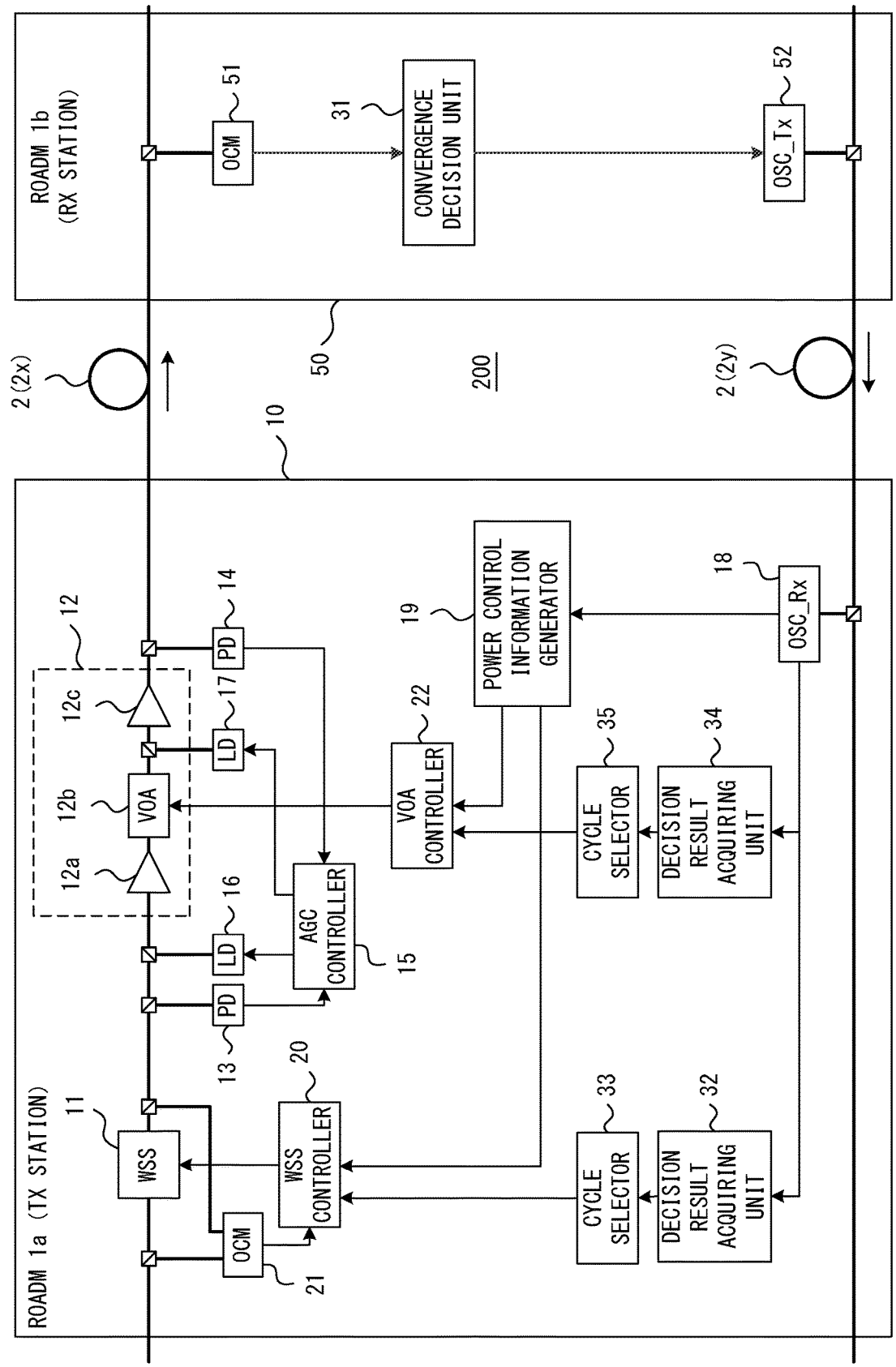
FIG. 12 illustrates a second variation of the optical transmission system according to the embodiment of the present invention.

In the configuration illustrated in FIG. 12, the receiver side station 50 includes the convergence decision unit 31. In this case, the receiver side station 50 decides whether or not the control system has converged. The receiver side station 50 transmits the decision result to the transmitter side station 10 in addition to the optical power information. Then, the transmitter side station 10 controls the optical transmitting power of each wavelength channel of the WDM signal based on the optical power information and the decision result received from the receiver side station 50. However, the power control information is generated by the power control information generator 19 provided in the transmitter side station 10.

Figure 13:
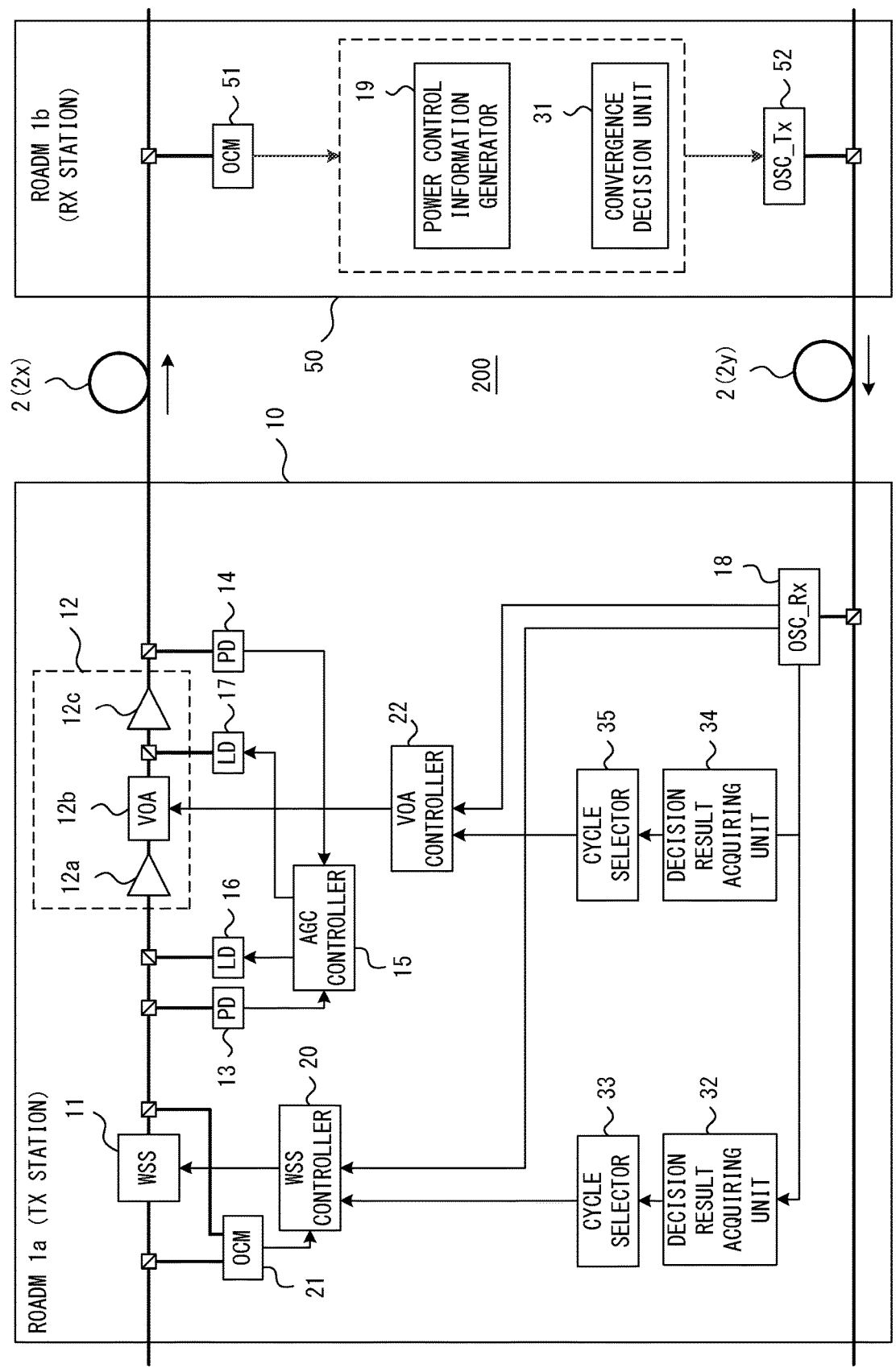
FIG. 13 illustrates a third variation of the optical transmission system according to the embodiment of the present invention.

In the configuration illustrated in FIG. 13, the receiver side station 50 includes the power control information generator 19 and the convergence decision unit 31. In this case, the receiver side station 50 generates the power control information and decides whether or not the control system has converged. The receiver side station 50 transmits the optical power information, the power control information, and the decision result to the transmitter side station 10. Then, the transmitter side station 10 controls the optical transmitting power of each wavelength channel of the WDM signal based on the optical power information, the power control information, and the decision result received from the receiver side station 50.

Transmission Power Control Based on GSNR

In the example described above, the optical transmitting power control is performed in the transmitter side station 10 so that the optical powers of wavelength channels of the WDM signal received by the receiver side station 50 are equalized. However, in order to equalize the quality of each wavelength channel, it is sometimes preferable to perform optical transmitting power control based on an optical signal-to-noise ratio (OSNR) or a generalized SNR (GSNR) of each wavelength channel. In the following embodiment, optical transmitting power control is performed so that the GSNRs of the wavelength channels are equalized.

The GSNR is expressed by Formula (1).

$$\frac{1}{GSNR} = \frac{1}{SNR\_L} + \frac{1}{SNR\_NL} \quad (1)$$

SNR_L represents a ratio between an optical signal and linear noise, and can be calculated from the OSNR. SNR_NL represents a ratio between an optical signal and non-linear noise.

Figure 14A:
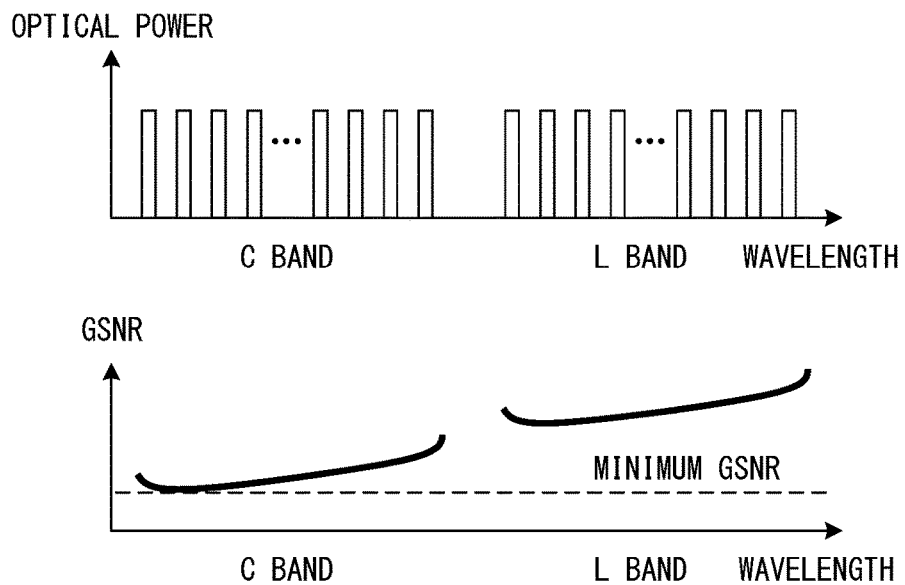
FIGS. 14A and 14B illustrate an example of a GSNR at a receiver side station.
Figure 14B:
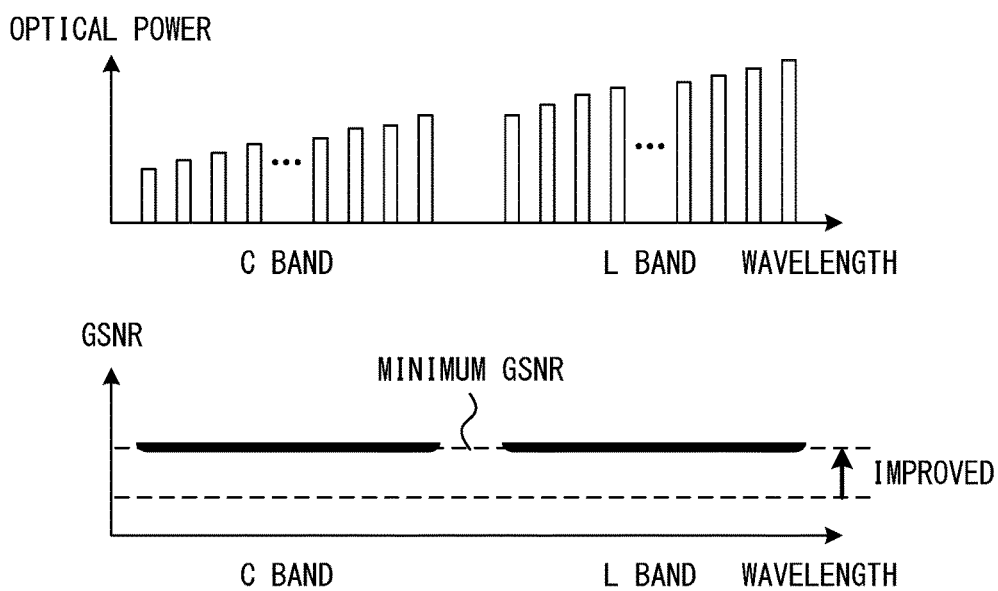

FIGS. 14A and 14B illustrate an example of a GSNR at the receiver side station 50. In the example illustrated in FIG. 14A, the optical power of each wavelength channel of the WDM signal transmitted from the transmitter side station 10 is equalized. However, when the WDM signal propagates through the optical fiber transmission line, linear noise and non-linear noise are generated. Therefore, in the receiver side station 50, the GSNR is not flat with respect to the wavelength. In the example illustrated in FIG. 14A, the GSNR is smaller in the short wavelength region in the C band. Here, an error is likely to occur in a wavelength channel having a small GSNR. Therefore, it is important to increase the minimum GSNR.

As described above, the transmitter side station 10 controls the optical transmitting power of each wavelength channel of the WDM signal based on the optical power information generated by the receiver side station 50. At this time, the transmitter side station 10 preferably controls the optical power of each wavelength channel of the WDM signal so as to increase the minimum GSNR in the receiver side station 50. For example, as illustrated in FIG. 14B, the transmitter side station 10 controls the optical power of each wavelength channel of the WDM signal so that the GSNR becomes flat with respect to the wavelength. By doing this, the minimum GSNR is increased, and the quality of the WDM signal is improved.

Figure 15:
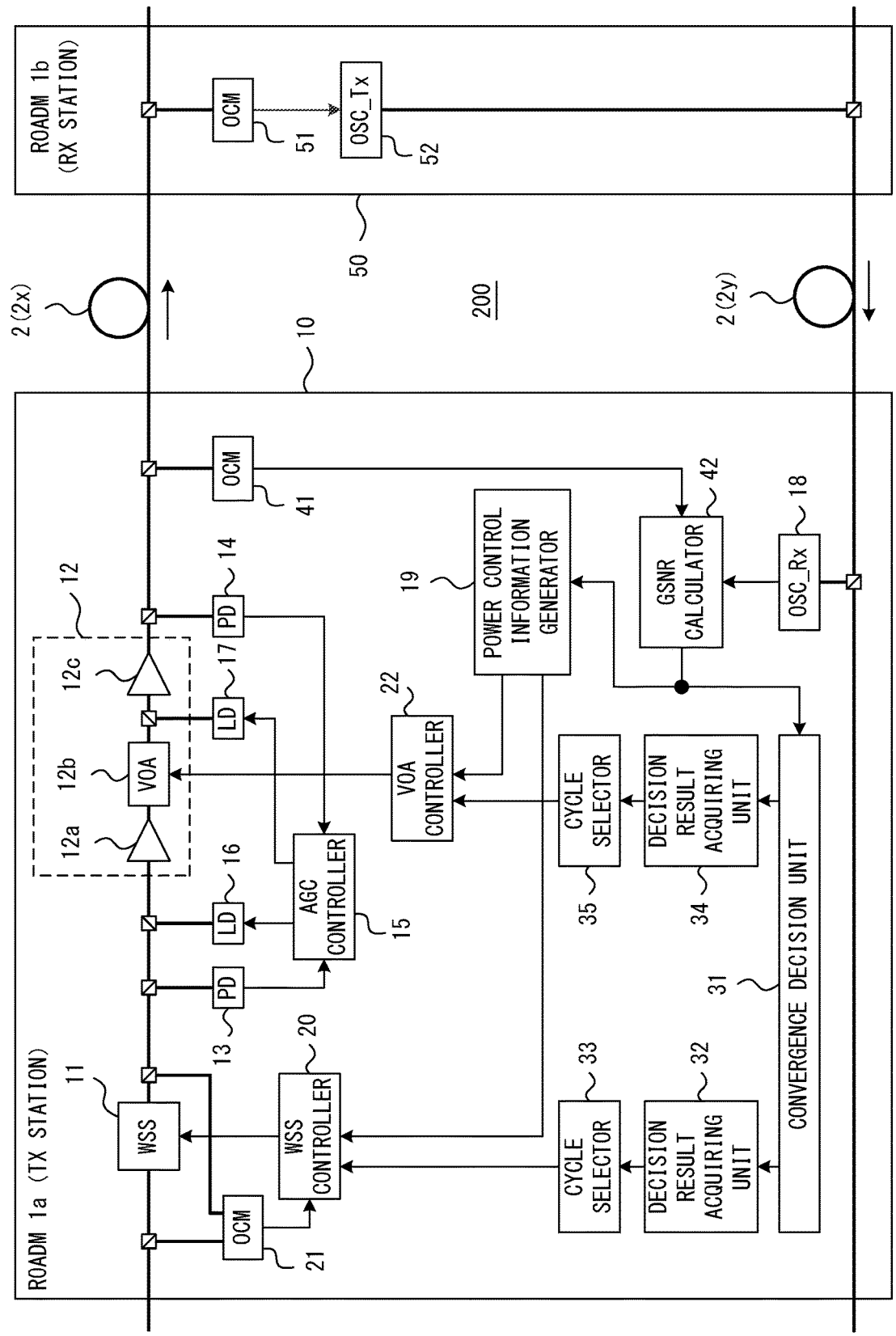
FIG. 15 illustrates an example of an optical transmission system that controls optical transmitting power based on a GSNR.

FIG. 15 illustrates an example of an optical transmission system that controls optical transmitting power based on a GSNR. In this example, the transmitter side station 10 includes an OCM 41 and a GSNR calculator 42 in addition to the configuration illustrated in FIG. 4. Note that the configuration of the receiver side station 50 is substantially the same in FIGS. 4 and 15.

The OCM 41 monitors optical power of each wavelength channel of the WDM signal output from the transmitter side station 10 to the optical fiber transmission line 2. The monitoring result of the OCM 41 is notified to the GSNR calculator 42. The GSNR calculator 42 calculates a GSNR of each wavelength channel of the WDM signal. The GSNR is calculated from the linear SNR and the non-linear SNR as described above. Note that the linear SNR is not strictly the same as the OSNR, but is assumed to be equivalent to the OSNR in this example.

The linear SNR is calculated based on optical power information received from the receiver side station 50. As described above, the optical power information indicates the optical power of each wavelength channel of the WDM signal received by the receiver side station 50. That is, the optical power information represents the spectrum of the WDM signal received by the receiver side station 50.

Figure 16A:
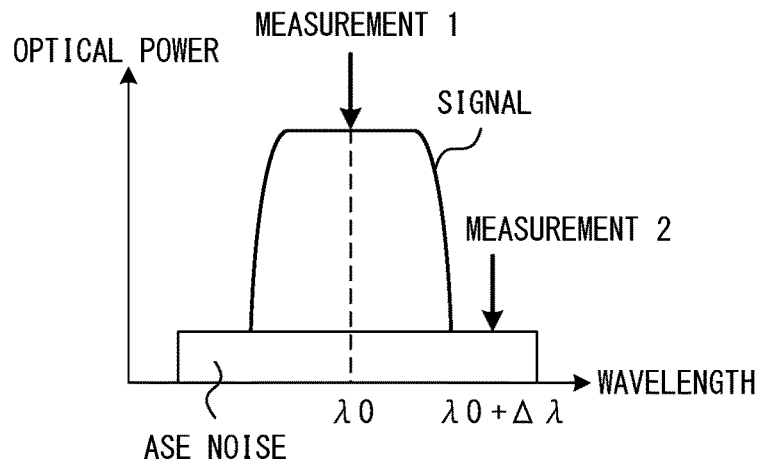
FIGS. 16A and 16B illustrate examples of methods for calculating a linear SNR of a wavelength channel.
Figure 16B:
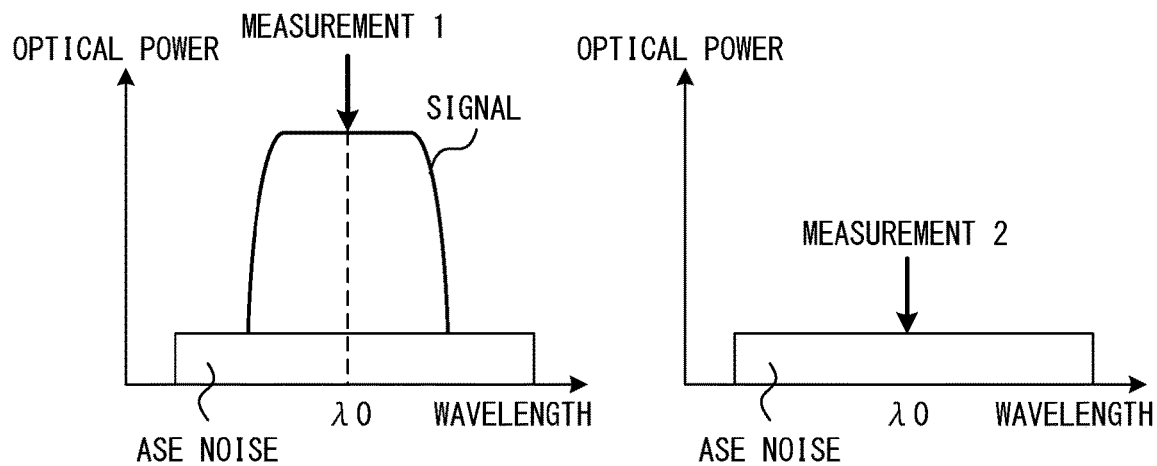

FIGS. 16A and 16B illustrate an example of a method of calculating a linear SNR of a wavelength channel. In the method illustrated in FIG. 16A, the GSNR calculator 42 detects the optical power of the center wavelength λ0 of the wavelength channel (measurement 1). As a result, the optical power P_CH(i) of the signal of the wavelength channel i is detected. In addition, the GSNR calculator Δλ detects optical power of a wavelength shifted by Δλ from the wavelength λ0 (measurement 2). λ0+Δλ is a wavelength at which a signal component is sufficiently small. Therefore, the optical power detected at λ0+Δλ corresponds to the power of an ASE noise. That is, the optical power P_ASE of the ASE noise is detected. Then, the GSNR calculator 42 calculates the linear SNR of the wavelength channel i using Formula (2).

$$SNR\_L(i) = P\_CH(i)/P\_ASE \quad (2)$$

According to the method illustrated in FIG. 16A, it is possible to calculate a linear SNR while transmitting a data signal. However, in a case where a spacing between the wavelength channels of the WDM signal is narrow, it is difficult to accurately measure the optical power of the ASE noise.

In the method illustrated in FIG. 16B, the optical power of the center wavelength Δ0 of the wavelength channel is detected in a state where the signal is transmitted (measurement 1). As a result, the optical power of the signal of the wavelength channel i is detected. In addition, the optical power of the wavelength Δ0 is detected in a state where the signal is stopped (measurement 2). As a result, the optical power of the ASE noise is detected. Then, the GSNR calculator 42 calculates the linear SNR of the wavelength channel i using Formula (2). In this manner, the GSNR calculator 42 calculates the linear SNR of each wavelength channel based on the optical power information received from the receiver side station 50. In addition, a linear SNR may be calculated from input power to the amplifier and a noise figure (NF).

The non-linear SNR of each wavelength channel is calculated based on the optical power detected by the OCM 41 provided in the transmitter side station 10. Here, the intensity of the non-linear noise is proportional to the cube of the power of the light input to the optical fiber transmission line 2. That is, the non-linear noise P_NLI is expressed by Formula (3).

$$P\_NLI = \eta (P\_CH(T))^3 \quad (3)$$

"η d" represents a proportionality coefficient for calculating the non-linear SNR. "P_CH(T)" represents optical transmitting power of a measurement target wavelength channel. Note that this relationship is described in, for example, P. Poggiolini, Analytical modeling of non-linear propagation in coherent systems, in Proc. OFC 2013, Anaheim, CA, March 2013.

Here, when the bandwidth of the wavelength channel is constant, the non-linear noise per unit bandwidth (for example, 12.5 GHz) is expressed by Formula (4).

$$G\_NLI = \eta d (P\_CH(T)/B\_CH)^3 \quad (4)$$

"η d" represents a proportionality coefficient. "B_CH" represents the bandwidth of the wavelength channel.

Therefore, the non-linear SNR is expressed by Formula (5).

$$\text{SNR\_NL} = \frac{\text{P\_CH}(T)/\text{B\_CH}}{\text{G\_NLI}} = \frac{1}{\eta d (\text{P\_CH}(T)/\text{B\_CH})^2} \quad (5)$$

Here, the proportionality coefficient id is assumed to be known. In addition, the bandwidth of the wavelength channel is known. Therefore, when the optical power P_CH(T) of the wavelength channel is detected using the OCM 41, the non-linear SNR is calculated. Note that "P_CH(T)/B)CH" corresponds to the optical fiber input power per unit bandwidth.

The GSNR calculator 42 calculates the GSNR based on the linear SNR and the non-linear SNR for each wavelength channel. In this example, the GSNR is calculated by Formula (6).

$$\frac{1}{GSNR} = \frac{1}{\text{SNR\_L}} + \frac{1}{\text{SNR\_NL}} \quad (6)$$

Figure 17:
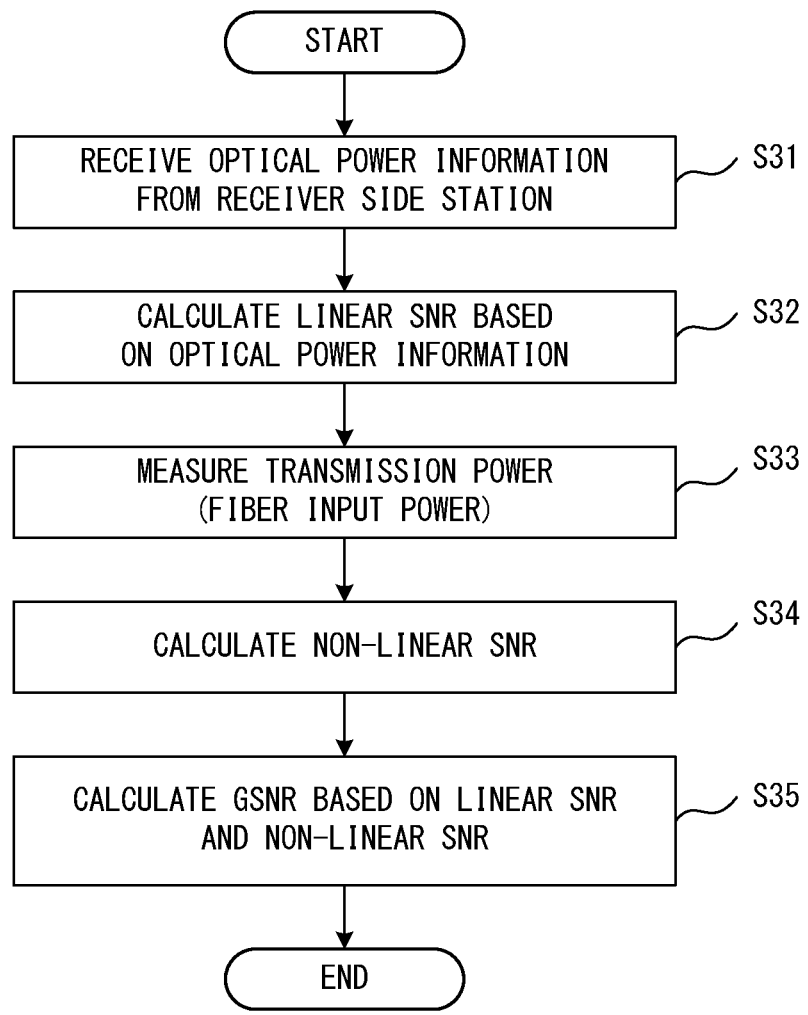
FIG. 17 is a flowchart illustrating an example of a method for calculating a GSNR.

FIG. 17 is a flowchart illustrating an example of a method for calculating a GSNR. In this example, the process of this flowchart is executed by the GSNR calculator 42 provided in the transmitter side station 10.

In S31, the GSNR calculator 42 acquires optical power information from the receiver side station 50. In S32, the GSNR calculator 42 calculates a linear SNR of each wavelength channel based on the optical power information. In S33, the GSNR calculator 42 measures optical transmitting power of each wavelength channel using the OCM 41. In S34, the GSNR calculator 42 calculates a non-linear SNR of each wavelength channel based on the measurement result in S33. Then, in S35, the GSNR calculator 42 calculates the GSNR for each wavelength channel in accordance with Formula (6).

The description returns to FIG. 15. The power control information generator 19 controls optical transmitting power of each wavelength channel of the WDM signal based on the GSNR of each wavelength channel calculated by the GSNR calculator 42. Specifically, for example, the power control information generator 19 may control the optical transmitting power of each wavelength channel of the WDM signal so as to reduce the variation in the GSNR of the wavelength channels. At this time, the power control information generator 19 controls the attenuation amount for each wavelength channel in the WSS 11 and controls the attenuation amount of the VOA 12b.

Here, the target value TP_CH(i) of the optical transmitting power (that is, fiber input power) of the wavelength channel i is updated by Formula (7).

$$TP\_CH(i) = P\_CH(i) + \Delta P\_CH(i) \quad (7)$$

P_CH(i) represents the fiber input power of the wavelength channel i before the update. In addition, ΔP_CH(i) represents an adjustment value of the target value of the wavelength channel i.

The adjustment value of the target value of the fiber input power of the wavelength channel i is determined based on the GSNR of the wavelength channel i and the average value of the GSNR, for example, as indicated in Formula (8).

$$\Delta P\_CH(i) = f1(GSNR(i), \overline{GSNR}) \quad (8)$$

GSNR(i) represents the GSNR of the wavelength channel i. The function f1 is achieved by, for example, a calculation formula that makes the GSNR of the wavelength channel i close to the average value of the GSNR.

Then, the power control information generator 19 determines the gain of the optical amplifier circuit 12 based on, for example, the average of the target values of the fiber input power of the respective wavelength channels. Here, the gains of the optical amplifiers 12a and 12c are controlled by the AGC controller 15. Therefore, the power control information generator 19 substantially determines the attenuation amount of the VOA 12b.

Further, the power control information generator 19 determines the attenuation amount of each wavelength channel in the WSS 11 based on the target value of the fiber input power and the gain of the optical amplifier circuit 12. For example, the attenuation amount ATT_CH(i) of the wavelength channel i in the WSS 11 is calculated by Formula (9).

$$\Delta TT\_CH(i) = P\_in(i) + G - TP\_CH(i) \quad (9)$$

P_in (i) represents the input power of the WSS 11 of the wavelength channel i. G represents the gain of the optical amplifier circuit 12.

In the embodiment illustrated in FIG. 4, the convergence decision unit 31 decides whether or not the optical power of each wavelength channel has converged to the target level. On the other hand, in the embodiment illustrated in FIG. 15, the convergence decision unit 31 decides whether or not the GSNR of each wavelength channel has converged to the target level. The target level is, for example, an average of GSNRs of each wavelength channel. In this case, if the GSNRs of all the wavelength channels are within the convergence range corresponding to the target level, the convergence decision unit 31 decides that the control system that controls the optical transmitting power of the WDM signal has converged. If the GSNR of one or more wavelength channels deviates from the convergence range, the convergence decision unit 31 decides that the control system has not converged.

The operations of the decision result acquiring units 32 and 34 and the cycle selectors 33 and 35 are as described with reference to FIG. 7. Therefore, also in the embodiment illustrated in FIG. 15, when the control system has not converged, the optical transmitting power is adjusted in the first cycle, and when the control system has converged, the optical transmitting power is adjusted in the second cycle longer than the first cycle.

Hardware Configuration

The power control information generator 19, the WSS controller 20, the VOA controller 22, the convergence decision unit 31, the decision result acquiring units 32 and 34, the cycle selectors 33 and 35, and the GSNR calculator 42 are implemented by, for example, a computer including a processor and a memory. In this case, the processor executes the program stored in the memory to provide the functions of the power control information generator 19, the WSS controller 20, the VOA controller 22, the convergence decision unit 31, the decision result acquiring units 32 and 34, the cycle selectors 33 and 35, and the GSNR calculator 42. However, some or all of these functions may be implemented by a hardware circuit.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An optical transmission system that transmits a WDM (wavelength division multiplexed) signal from a first optical transmission device to a second optical transmission device via an optical fiber transmission line, the optical transmission system comprising:
an optical channel monitor that detects optical power of each wavelength channel of the WDM signal in the second optical transmission device;
a processor that controls optical power of each wavelength channel of the WDM signal based on a detection result by the optical channel monitor in the first optical transmission device;
an optical circuit that adjusts optical power of each wavelength channel of the WDM signal based on a control signal from the processor in the first optical transmission device; and
a second processor that decides whether or not optical powers of wavelength channels of the WDM signal have converged to a target level based on a detection result by the optical channel monitor, wherein
when the optical powers of wavelength channels of the WDM signal have not converged to the target level, the processor controls the optical circuit using the control signal in a first cycle, and
when the optical powers of wavelength channels of the WDM signal have converged to the target level, the processor controls the optical circuit using the control signal in a second cycle longer than the first cycle.

2. The optical transmission system according to claim 1, wherein
the optical circuit includes:
a channel power adjustment device that adjusts optical power of each wavelength channel of the WDM signal; and
an optical amplifier circuit that adjusts optical power of the WDM signal output from the channel power adjustment device,
the optical amplifier circuit includes:
a first optical amplifier that amplifies the WDM signal output from the channel power adjustment device;
a variable optical attenuator that attenuates the WDM signal output from the first optical amplifier; and
a second optical amplifier that amplifies the WDM signal output from the variable optical attenuator,
the control signal generated by the processor includes a first control signal representing a loss amount of each wavelength channel in the channel power adjustment device and a second control signal representing an attenuation amount of the variable optical attenuator,
the channel power adjustment device adjusts optical power of each wavelength channel in accordance with the first control signal, and
the variable optical attenuator attenuates the WDM signal output from the first optical amplifier in accordance with the second control signal.

3. The optical transmission system according to claim 2, wherein
when optical powers of wavelength channels of the WDM signal transition from a non-converged state to a converged state, the processor changes a control cycle for adjusting an attenuation amount of the variable optical attenuator using the second control signal from the first cycle to the second cycle, and when the optical powers of wavelength channels of the WDM signal have converged to the target level after a lapse of a specified time from when the control cycle for adjusting the attenuation amount of the variable optical attenuator is changed from the first cycle to the second cycle, the processor changes the control cycle for adjusting the loss amount of each wavelength channel in the channel power adjustment device using the first control signal from the first cycle to the second cycle.

4. The optical transmission system according to claim 2, wherein
when optical powers of wavelength channels of the WDM signal transition from a converged state to a non-converged state, the processor changes a control cycle for adjusting an attenuation amount of the variable optical attenuator using the second control signal from the second cycle to the first cycle, and
when the optical powers of wavelength channels of the WDM signal have not converged to the target level after a lapse of a specified time from when the control cycle for adjusting the attenuation amount of the variable optical attenuator is changed from the second cycle to the first cycle, the processor changes the control cycle for adjusting the loss amount of each wavelength channel in the channel power adjustment device using the first control signal from the second cycle to the first cycle.

5. The optical transmission system according to claim 2, wherein
when the optical powers of wavelength channels of the WDM signal transition from a non-converged state to a converged state, the processor changes a control cycle for adjusting a loss amount of each wavelength channel in the channel power adjustment device using the first control signal from the first cycle to the second cycle, and
when the optical powers of wavelength channels of the WDM signal transition from the converged state to the non-converged state, the processor changes the control cycle for adjusting a loss amount of each wavelength channel in the channel power adjustment device using the first control signal from the second cycle to the first cycle.

6. The optical transmission system according to claim 2, wherein
when the optical powers of wavelength channels of the WDM signal transition from a non-converged state to a converged state, the processor changes a control cycle for adjusting an attenuation amount of the variable optical attenuator using the second control signal from the first cycle to the second cycle, and
when the optical powers of wavelength channels of the WDM signal transition from the converged state to the non-converged state, the processor changes the control cycle for adjusting an attenuation amount of the variable optical attenuator using the second control signal from the second cycle to the first cycle.

7. An optical transmission system that transmits a WDM (wavelength division multiplexed) signal from a first optical transmission device to a second optical transmission device via an optical fiber transmission line, the optical transmission system comprising:
a processor that calculates a GSNR (generalized signal-to-noise ratio) of each wavelength channel of the WDM signal and controls optical power of each wavelength channel of the WDM signal based on the GSNR in the first optical transmission device;

an optical circuit that adjusts optical power of each wavelength channel of the WDM signal based on a control signal from the processor in the first optical transmission device; and a second processor that decides whether or not the GSNRs of wavelength channels of the WDM signal have converged to a target level, wherein when the GSNRs of wavelength channels of the WDM signal have not converged to the target level, the processor controls the optical circuit using the control signal in a first cycle, and when the GSNRs of wavelength channels of the WDM signal have converged to the target level, the processor controls the optical circuit using the control signal in a second cycle longer than the first cycle.

8. An optical transmission device that transmits a WDM (wavelength division multiplexed) signal to a reception node via an optical fiber transmission line, the optical transmission device comprising:

a processor that controls optical power of each wavelength channel of the WDM signal based on optical power information indicating received optical power of each wavelength channel of the WDM signal detected in the reception node;

an optical circuit that adjusts optical power of each wavelength channel of the WDM signal based on a control signal from the processor; and a second processor that decides whether or not the optical powers of wavelength channels of the WDM signal have converged to a target level based on the optical power information, wherein when the optical powers of wavelength channels of the WDM signal have not converged to the target level, the processor controls the optical circuit using the control signal in a first cycle, and when the optical powers of wavelength channels of the WDM signal have converged to the target level, the processor controls the optical circuit using the control signal in a second cycle longer than the first cycle.

\* \* \* \* \*